US012783104B2

(12) United States Patent
McIvor et al.

(10) Patent No.: US 12,783,104 B2
(45) **Date of Patent: *Nov. 3, 2026**

(54) DYNAMICALLY UPDATING USER INTERFACES FROM SIMULATION DATA

(71) Applicant: DK Crown Holdings Inc., Boston, MA (US)

(72) Inventors: John Taylor McIvor, London (GB); Robin Mohseni, Billericay (GB)

(73) Assignee: DK Crown Holdings Inc., Boston, MA (US)

( * ) Notice: Subject to any disclaimer, the term of this patent is extended or adjusted under 35 U.S.C. 154(b) by 230 days.

This patent is subject to a terminal disclaimer.

(21) Appl. No.: 18/819,718

(22) Filed: Aug. 29, 2024

(65) Prior Publication Data

US 2024/0419300 A1 Dec. 19, 2024

Related U.S. Application Data

(63) Continuation of application No. 18/204,194, filed on May 31, 2023, now Pat. No. 12,079,449, which is a continuation of application No. 18/067,353, filed on Dec. 16, 2022, now Pat. No. 11,704,000.

(51) Int. Cl.
*G06F 3/0482* (2013.01)
*G06F 9/451* (2018.01)

(52) U.S. Cl.
CPC ............ *G06F 3/0482* (2013.01); *G06F 9/451* (2018.02)

(58) Field of Classification Search
CPC ............................... G06F 3/0482; G06F 9/451
See application file for complete search history.

(56) References Cited

U.S. PATENT DOCUMENTS

| | | | | |
|---|---|---|---|---|
| 10,926,178 | B1 * | 2/2021 | Batty | A63F 13/47 |
| 11,568,713 | B2 * | 1/2023 | Schwartz | G07F 17/3239 |
| 2020/0234543 | A1 * | 7/2020 | Schwartz | G07F 17/3279 |
| 2022/0058107 | A1 * | 2/2022 | Hahn | G06F 11/324 |
| 2022/0147201 | A1 * | 5/2022 | Morrison | G06Q 50/34 |
| 2022/0383704 | A1 * | 12/2022 | Amaitis | G07F 17/323 |

OTHER PUBLICATIONS

Non-Final Office Action in U.S. Appl. No. 18/204,194 dated Jan. 19, 2024.
Notice of Allowance in U.S. Appl. No. 18/204,194 dated May 1, 2024.
Notice of Allowance in U.S. Appl. No. 18/067,353 dated Mar. 1, 2023.

* cited by examiner

*Primary Examiner* — Anil K Bhargava
(74) *Attorney, Agent, or Firm* — Foley & Lardner LLP

(57) ABSTRACT

Systems and methods for dynamically updating user interfaces are disclosed. A system can identify a set of samples of a joint-probability distribution of a plurality of conditional events to occur during a live event, and provide a user interface for presentation at a computing device with user interface elements each indicating a respective conditional event. The system can receive a first selection of a first conditional event from the computing device, and dynamically generate, based on the set of samples and responsive to the first selection, a respective probability value for a combined selection of conditional events including the first conditional event and each other conditional event. The system can provide instructions to update the user interface to include a respective indicator corresponding to the respective probability value for each combined selection.

20 Claims, 13 Drawing Sheets

500A

500B

500C

500D

DYNAMICALLY UPDATING USER INTERFACES FROM SIMULATION DATA

CROSS-REFERENCES TO RELATED APPLICATIONS

This application is a continuation of and claims priority to U.S. patent application Ser. No. 18/204,194, filed May 31, 2023, titled "DYNAMICALLY UPDATING USER INTERFACES FROM SIMULATION DATA," which is a continuation of and claims priority to U.S. patent application Ser. No. 18/067,353, filed Dec. 16, 2022, titled "DYNAMICALLY UPDATING USER INTERFACES FROM SIMULATION DATA," the contents of each of which are incorporated by reference in its entirety for all purposes.

BACKGROUND

Content management systems allocate and utilize large amounts of computing resources to communicate and process data from a large number of remote computing devices. When serving a large number of remote computing devices, memory and processing power are finite resources. These factors compound when performing complex calculations to display at each remote computing device. Therefore, it is challenging to appropriately distribute and process information to and from a large number of devices.

SUMMARY

The systems and methods of this technical solution provide techniques for dynamically updating user interfaces presented by computing devices based on real-time (or near real-time) selections and outcomes of live events. Client devices can access information about live events, which may include probabilities of various event outcomes, or combinations of outcomes. Existing technical solutions utilize brute-force approaches to calculate such probabilities. Brute-force approaches become computationally impracticable as the number of combinations of potential outcomes during live events increases, particularly when many client devices are accessing the outcomes at the same time. To address these and other issues, the systems and methods described herein utilize results produced from simulations to estimate the probability of combinations of events requested via client devices. In addition, selections of combinations of events can be cached for each client device (e.g., as part of a session), such that the probabilities for an additional selected outcome to occur during the live event can be computed efficiently based on the simulation data. This provides a significant improvement in computational performance and significantly reduces the computational resources required to process requests from large numbers of client devices. These and other improvements are described in further detail herein.

At least one aspect of the present disclosure relates to a method. The method can be performed, for example, by one or more processors coupled to a non-transitory memory. The method can include identifying a set of samples of a joint-probability distribution of a plurality of conditional events to occur during a live event. The plurality of conditional events can include a first conditional event and a plurality of second conditional events. The method can include providing, for presentation at a computing device, a user interface comprising a plurality of user interface elements. Each user interface element of the plurality of user interface elements can indicate a respective conditional event of the plurality of conditional events. The method can include receiving, from the computing device, a first selection of a first user interface element of the plurality of user interface elements corresponding to the first conditional event. The method can include dynamically generating, based on the set of samples and responsive to the first selection, for each second conditional event of the plurality of second conditional events, a respective probability value for a combined selection of conditional events including the first conditional event and the second conditional event. The method can include providing, to the computing device, instructions to update the user interface to include, for each second conditional event, a respective indicator corresponding to the respective probability value for the combined selection of conditional events including the first conditional event and the second conditional event.

In some implementations, the method can include maintaining a data structure comprising the plurality of conditional events stored in association with an identifier of the live event, and respective probability values for each of the plurality of conditional events. In some implementations, the method can include generating samples from the joint-probability distribution of the plurality of conditional events based on the data structure. In some implementations, the method can include identifying an update to the joint-probability distribution. In some implementations, the method can include dynamically updating, based on the update to the joint-probability distribution, the respective probability value for the combined selection of conditional events.

In some implementations, the plurality of second conditional events includes a subset of third conditional events. In some implementations, the method can include receiving, from the computing device, a second selection of a second user interface element corresponding to a second conditional event of the plurality of second conditional events. In some implementations, the method can include dynamically generating, based on the set of samples and responsive to the second selection, for each third conditional event of the subset of third conditional events, a respective probability value for the combined selection of conditional events including the first conditional event, the second conditional event, and the third conditional event.

In some implementations, the method can include providing, to the computing device, instructions to update the user interface to include, for each third conditional event, a respective indicator corresponding to the respective probability value for the combined selection of conditional events including the first conditional event, the second conditional event, and the third conditional event. In some implementations, the method can include storing each of the first selection of the first conditional event and the second selection of the second conditional event in a session for the computing device. In some implementations, the method can include dynamically generating, for each second conditional event of the plurality of second conditional events, a respective margin value based on the respective probability value of the combined selection of conditional events. In some implementations, the respective margin value is dynamically generated further based on a number of selections of conditional events received from the computing device. In some implementations, the respective margin value is dynamically generated further based on at least one of a minimum margin threshold or a maximum margin threshold.

At least one other aspect of the present disclosure is directed to a system. The system can include one or more processors coupled to a non-transitory memory. The system can identify a set of samples of a joint-probability distribution of a plurality of conditional events to occur during a live event. The plurality of conditional events can include a first conditional event and a plurality of second conditional events. The system can provide, for presentation at a computing device, a user interface comprising a plurality of user interface elements. Each user interface element of the plurality of user interface elements can indicate a respective conditional event of the plurality of conditional events. The system can receive, from the computing device, a first selection of a first user interface element of the plurality of user interface elements corresponding to the first conditional event. The system can dynamically generate, based on the set of samples and responsive to the first selection, for each second conditional event of the plurality of second conditional events, a respective probability value for a combined selection of conditional events including the first conditional event and the second conditional event. The system can provide instructions to update the user interface to include, for each second conditional event, a respective indicator corresponding to the respective probability value for the combined selection of conditional events including the first conditional event and the second conditional event.

In some implementations, the system can maintain a data structure comprising the plurality of conditional events stored in association with an identifier of the live event, and respective probability values for each of the plurality of conditional events. In some implementations, the system can generate samples from the joint-probability distribution of the plurality of conditional events based on the data structure. In some implementations, the system can identify an update to the joint-probability distribution. In some implementations, the system can dynamically update, based on the update to the joint-probability distribution, the respective probability value for the combined selection of conditional events.

In some implementations, the plurality of second conditional events includes a subset of third conditional events. In some implementations, the system can receive, from the computing device, a second selection of a second user interface element corresponding to a second conditional event of the plurality of second conditional events. In some implementations, the system can dynamically generate, based on the set of samples and responsive to the second selection, for each third conditional event of the subset of third conditional events, a respective probability value for the combined selection of conditional events including the first conditional event, the second conditional event, and the third conditional event.

In some implementations, the system can provide instructions to update the user interface to include, for each third conditional event, a respective indicator corresponding to the respective probability value for the combined selection of conditional events including the first conditional event, the second conditional event, and the third conditional event. In some implementations, the system can store each of the first selection of the first conditional event and the second selection of the second conditional event in a session for the computing device.

In some implementations, the system can dynamically generate, for each second conditional event of the plurality of second conditional events, a respective margin value based on the respective probability value of the combined selection of conditional events. In some implementations, the respective margin value is dynamically generated further based on a number of selections of conditional events received from the computing device. In some implementations, the respective margin value is dynamically generated further based on at least one of a minimum margin threshold or a maximum margin threshold.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, techniques, approaches, methods, apparatuses, and systems for dynamically updating user interfaces. The various concepts introduced above and discussed in greater detail below may be implemented in numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing embodiments described herein; and Section B describes techniques for dynamically updating user interfaces.

A. Computing and Network Environment

Figure 1A:
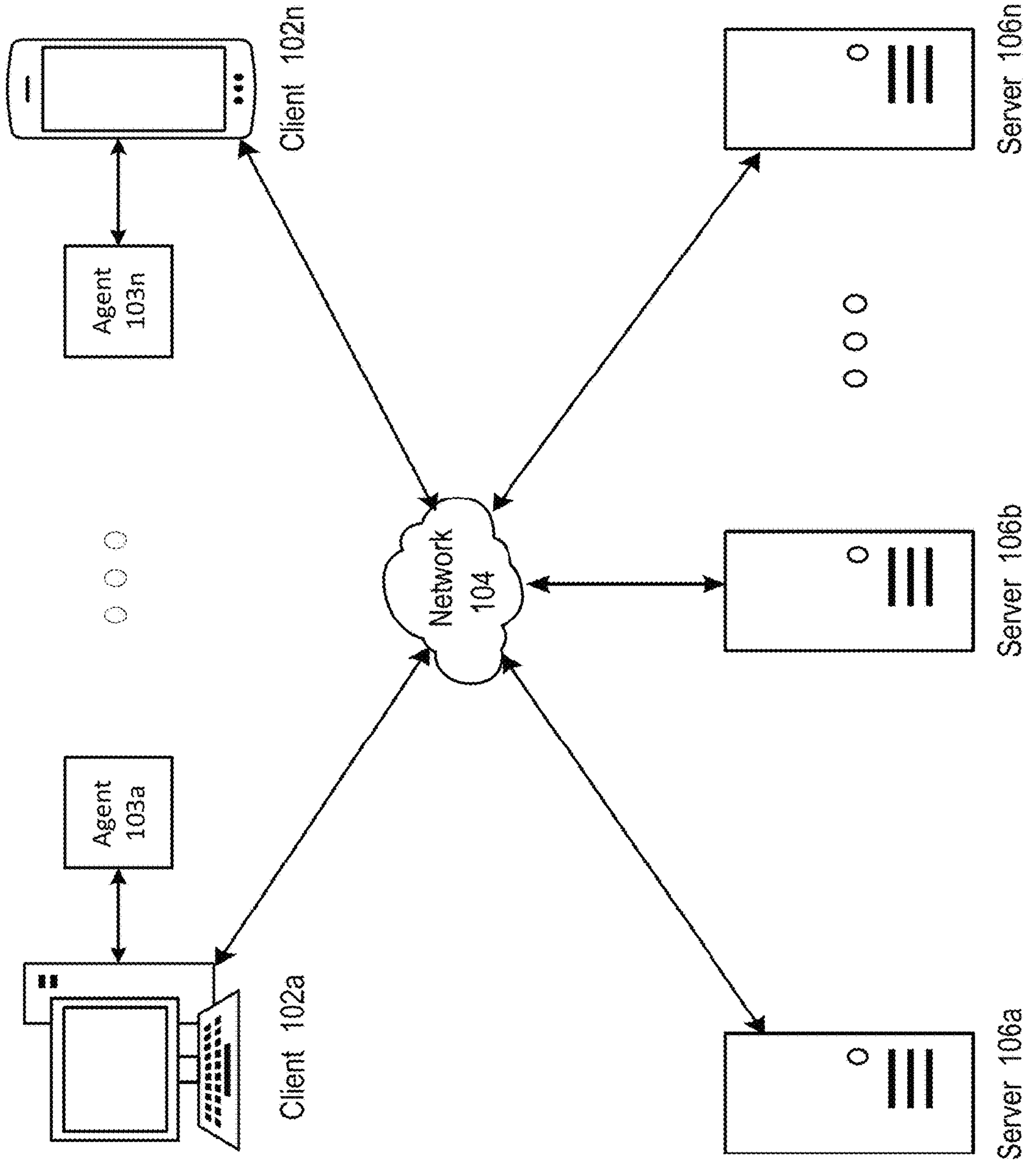
FIG. 1A is a block diagram depicting an embodiment of a network environment comprising a client device in communication with a server device.

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102*a*-102*n* (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103*a*-103*n* and one or more servers 106*a*-106*n* (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102*a*-102*n*.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN) (e.g., Intranet), a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous-one or more of the servers 106 or remote machines 106 can operate according to one type of operating system platform (e.g., WINDOWS NT, manufactured by Microsoft Corp. of Redmond, Washington), while one or more of the other servers 106 can operate according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft, or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems, and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 106 may be in the path between any two communicating servers.

Figure 1B:
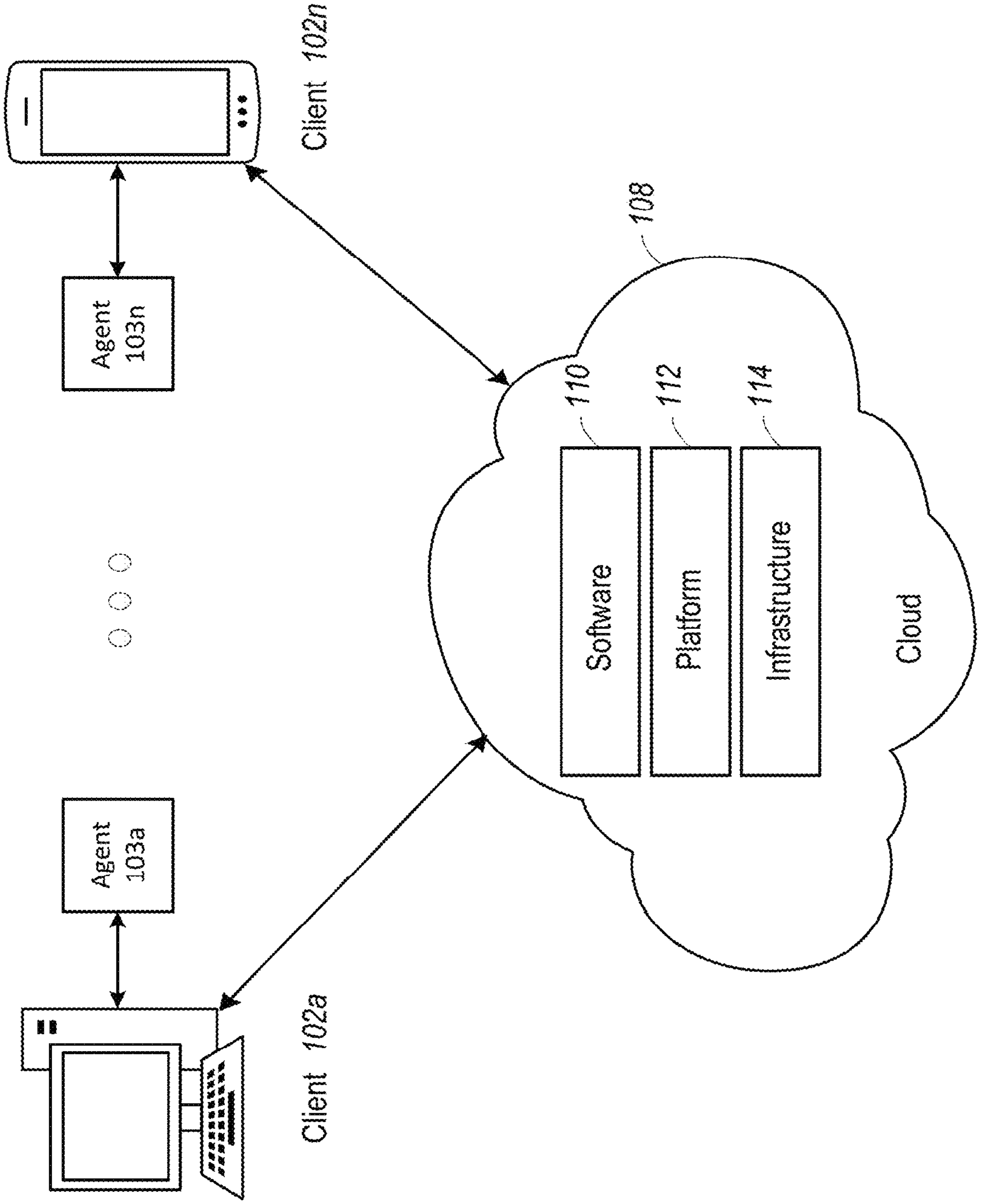
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102*a*-102*n*, in communication with respective agents 103*a*-103*n* and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms, or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients. Private clouds 108 may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources, including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages, including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
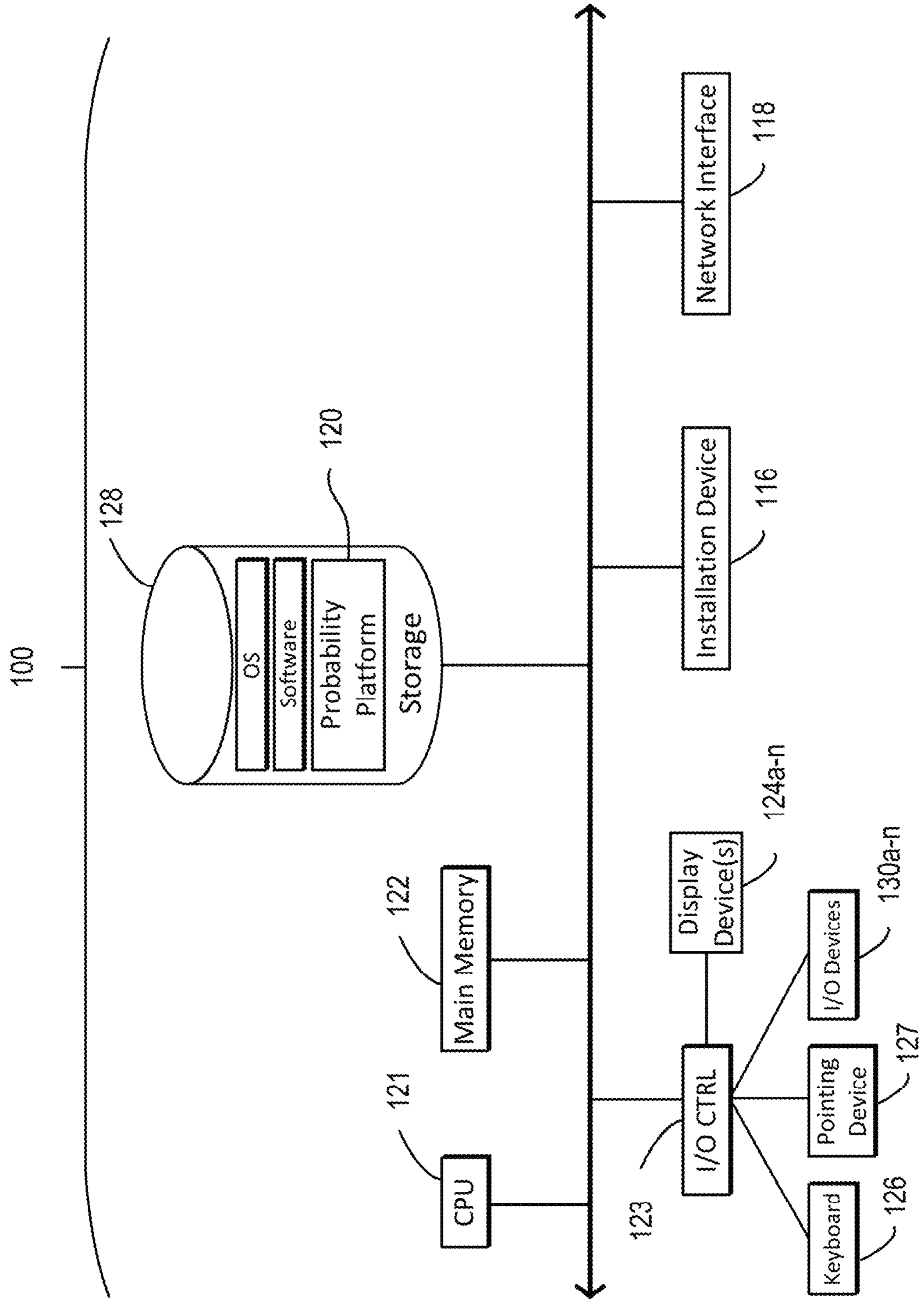
FIGS. 1C and 1D are block diagrams depicting embodiments of computing devices useful in connection with the methods and systems described herein.
Figure 1D:
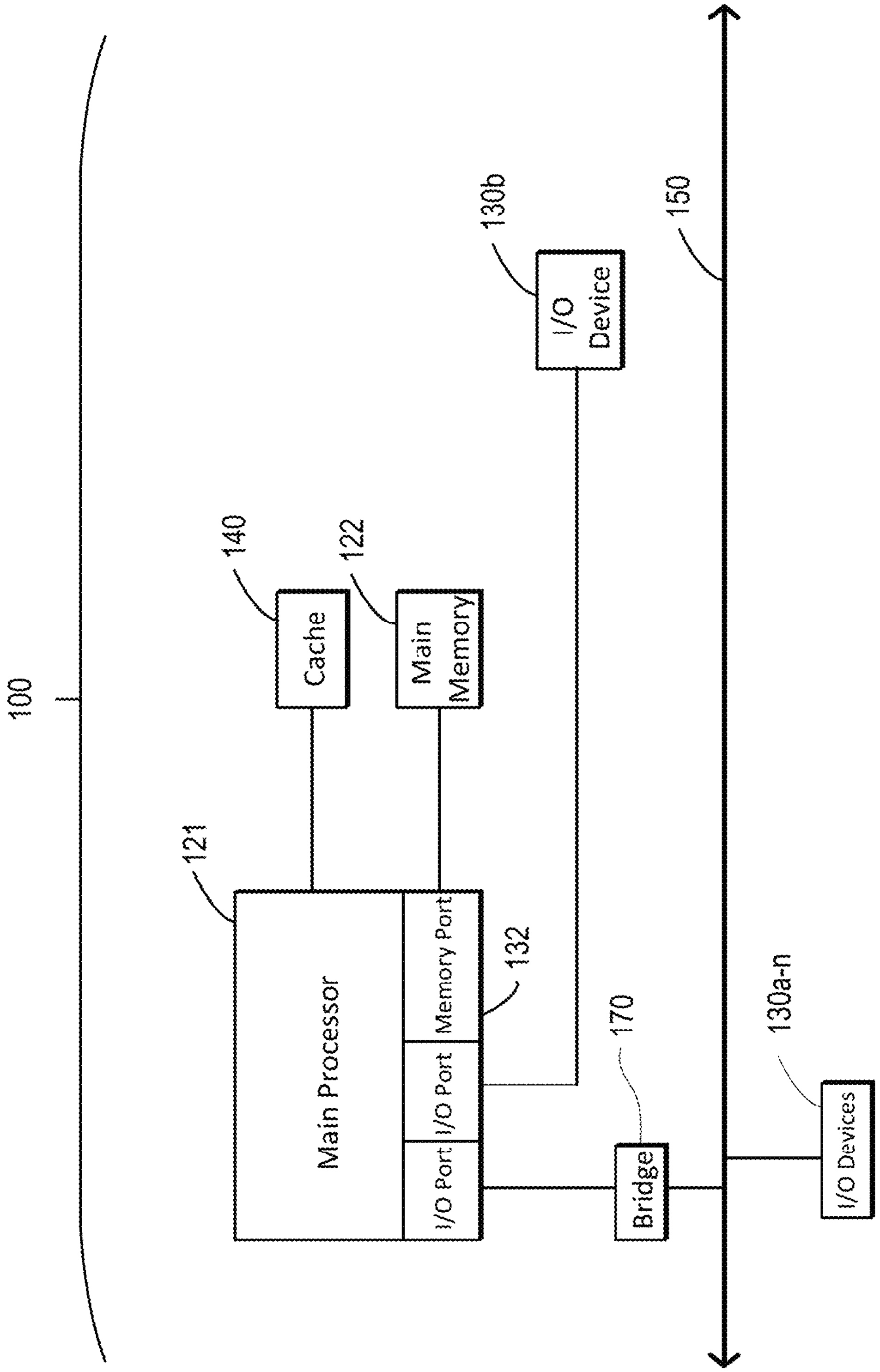

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121 and a main memory unit 122. As shown in FIG. 1C, a computing device 100 may include a storage device 128, an installation device 116, a network interface 118, an I/O controller 123, display devices 124*a*-124*n*, a keyboard 126, and a pointing device 127, e.g., a mouse. The storage device 128 may include, without limitation, an operating system, software, and probability platform 120, which can implement any of the features of the data processing system 205 described herein below in connection with FIG. 2. As shown in FIG. 1D, each computing device 100 may also include additional optional elements, e.g., a memory port 132, a bridge 170, one or more input/output devices 130*a*-130*n* (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130*b* or other processors 121' via HYPERTRANSPORT, RAPIDIO, or INFINIBAND communications technology. FIG. 1D also depicts an embodiment in which local busses and direct communication are mixed: the processor 121 communicates with I/O device 130*a* using a local interconnect bus 150 while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple IPHONE. Some devices 130*a*-130*n* allow gesture recognition inputs through combining some of the inputs and outputs. Some devices 130*a*-130*n* provide for facial recognition which may be utilized as an input for different purposes including authentication and other commands. Some devices 130*a*-130*n* provides for voice recognition and inputs, including, e.g., Microsoft KINECT, SIRI for IPHONE by Apple, Google Now, or Google Voice Search.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augmented reality devices. The I/O devices 130*a*-130*n* may be controlled by an I/O controller 123 as shown in FIG. 1C. The I/O controller 123 may control one or more I/O devices 130*a*-130*n*, such as, e.g., a keyboard 126 and a pointing device 127, e.g., a mouse or optical pen. Furthermore, an I/O device 130 may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a Fire Wire bus, an Ethernet bus, a Gigabit Ethernet bus, a Fibre Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect, or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g., one or more hard disk drives or redundant arrays of independent disks) for storing an operating system or other related software, and for storing application software programs such as any program related to the probability platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software 110 can be run from a bootable medium, for example, a bootable CD, e.g., KNOPPIX, a bootable CD for GNU/Linux that is available as a GNU/Linux distribution from knoppix.net.

Client device 100 may also install software 110 or application from an application distribution platform 112. Examples of application distribution platforms 112 include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform 112 may facilitate installation of software 110 on a client device 102. An application distribution platform 112 may include a repository of applications on a server 106 or a cloud 108, which the clients 102*a*-102*n* may access over a network 104. An application distribution platform 112 may include an application developed and provided by various developers. A user of a client device 102 may select, purchase, and/or download an application via the application distribution platform 112.

Furthermore, the computing device 100 may include a network interface 118 to interface to the network 104 through a variety of connections, including, but not limited to, standard telephone lines, LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc., of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing between the computing device 100 and any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc., of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats, including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet, e.g., the IPAD line of devices by Apple; GALAXY TAB family of devices by Samsung; or KINDLE FIRE, by Amazon.com, Inc., of Seattle, Washington. In other embodiments, the computing device 100 is an eBook reader, e.g., the KINDLE family of devices by Amazon.com, or NOOK family of devices by Barnes & Noble, Inc., of New York City, New York.

In some embodiments, the communications device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Dynamically Updating Live Events

The systems and methods of this technical solution provide techniques for dynamically updating user interfaces in real-time or near real-time based on user selections and outcomes of live events. Parlay wagers (e.g., same game parlays, or "SGPs") enable players to wager on multiple outcomes of one or more live events. One approach to providing odds values to players is to receive each selection of potential outcomes for the parlay wager, and subsequently perform complex calculations to determine the probability associated with the selections of the parlay wager. However, such brute-force approaches that are implemented by existing technical solutions to calculate the probability associated with parlay wagers becomes computationally impracticable to perform (e.g., exhausting memory and computational resources) as the number of combinations of potential outcomes during live events increases, particularly when large numbers of client devices are requesting parlay wagers concurrently. This is because the complexity of parlay wagers increases as the number of potential outcomes of the live events increases. The computational complexity of these calculations makes presentation of the probability data at a requesting client device in real-time or near real-time impracticable.

The systems and methods described herein provide techniques that enable a player to view the probability data associated with all available selections which might be added to the parlay wager (e.g., a "next-selection" or "next-leg") in real-time or near real-time. The next-selection probability values can be automatically updated at the user interface of a client device as conditions of one or more live events change. To do so, various simulations of live events can be executed in separate processes in response to changes in live events. This can result in an up-to-date repository of high dimensionality samples from a joint-probability distribution describing all possible wagering selections. This simulation data can be used to compute probability values for potential parlay wagers in real time or near real-time by counting the frequencies where selected outcomes of the parlay wager have occurred in the simulation data. When a client device makes an additional selection (e.g., adds a leg) to the parlay wager, the system can re-calculate the probabilities for all potential next selections by conditioning the next selection on the currently active combination of selections (e.g., the previously selected legs). This calculation can be performed in real time or near real-time, and used to dynamically update the user interface displayed at the client device to show the probability for each potential next leg of the selected parlay combination. This provides a significant improvement in computational performance and significantly reduces the computational resources required to process requests from large numbers of client devices. These and other improvements are described in further detail herein.

Figure 2:
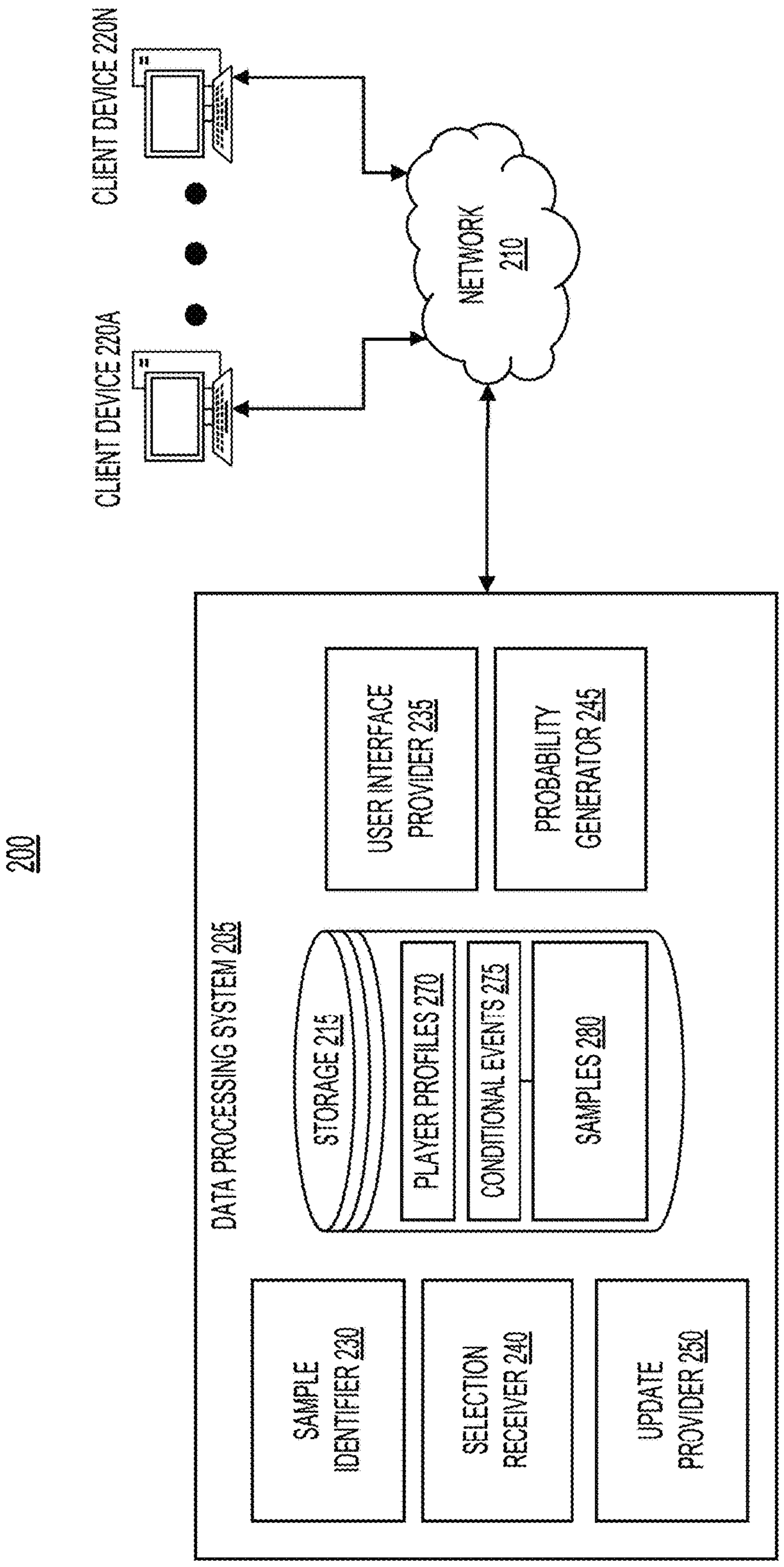
FIG. 2 is a block diagram of an example system for dynamically updating user interfaces, in accordance with one or more implementations.

Referring now to FIG. 2, illustrated is a block diagram of an example system 200 for dynamically updating user interfaces, in accordance with one or more implementations. The system 200 can include at least one data processing system 205, at least one network 210, and one or more client devices 220A-220N (sometimes generally referred to as client device(s) 220). The data processing system 205 can include a sample identifier 230, a user interface provider 235, a selection receiver 240, a probability generator 245, and an update provider 250, and at least one storage 215. The storage 215 can include one or more player profiles 270, one or more conditional events 275 (individual conditional events of which are sometimes referred to as a "conditional event 275"), and one or more samples 280 (e.g., which may include simulation results of live events). Although shown here as internal to the data processing system 205, the storage 215 can be external to the data processing system 205, for example, as a part of a cloud computing system or an external computing device in communication with the devices (e.g., the data processing system 205, the client devices 220, etc.) of the system 200 via the network 210.

Each of the components (e.g., the data processing system 205, the network 210, the client devices 220, the sample identifier 230, the user interface provider 235, the selection receiver 240, the probability generator 245, and the update provider 250, the storage 215, etc.) of the system 200 can be implemented using the hardware components or a combination of software with the hardware components of a computing system, such as the computing system 100 detailed herein in conjunction with FIGS. 1A-1D, or any other computing system described herein. Each of the components of the data processing system 205 can perform the functionalities detailed herein.

The data processing system 205 can include at least one processor and a memory (e.g., a processing circuit). The memory can store processor-executable instructions that, when executed by a processor, cause the processor to perform one or more of the operations described herein. The processor may include a microprocessor, an application-specific integrated circuit (ASIC), a field-programmable gate array (FPGA), a graphics processing unit (GPU), a tensor processing unit (TPU), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 205 can include one or more computing devices or servers that can perform various functions as described herein. The data processing system 205 can include any or all of the components and perform any or all of the functions of the computer system 100 described herein in conjunction with FIGS. 1A-1D.

In some implementations, the data processing system 205 may communicate with the client devices 220, for example, to provide user interfaces (e.g., the user interfaces described in connection with FIGS. 3A-3C, etc.) and to receive user input, via the network 210. In one example, the data processing system 205 can be or can include an application server or webserver, which may include software modules allowing various computing devices (e.g., the client devices 220, etc.) to access or manipulate data stored by the data processing system 205. For example, the data processing system 205 may include a webserver allowing the client devices 220 to access data (e.g., via one or more web-based user interfaces, such as those described in connection with FIGS. 3A-3C) that is collected and manipulated by the data processing system 205. For example, a player accessing the functionality of the data processing system 205 using a corresponding player profile 270 may execute a web browser application and access a website hosted on the webserver in order to make selections for parlay wagers, as described in further detail herein.

The network 210 can include computer networks such as the Internet, local, wide, metro or other area networks, intranets, satellite networks, other computer networks such as voice or data mobile phone communication networks, or combinations thereof. The data processing system 205 of the system 200 can communicate via the network 210 with one or more computing devices, such as the one or more client devices 220. The network 210 may be any form of computer network that can relay information between the data processing system 205, the one or more client devices 220, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive or transmit data within the network 210.

The network 210 may further include any number of hardwired or wireless connections. Any or all of the computing devices described herein (e.g., the data processing system 205, the one or more client devices 220, the computer system 100, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 210. Any or all of the computing devices described herein (e.g., the data processing system 205, the one or more client devices 220, the computer system 100, etc.) may also communicate wirelessly with the computing devices of the network 210 via a proxy device (e.g., a router, network switch, or gateway). In some implementations, the network 210 can be similar to or can include the network 104 or the cloud 108 described herein above in conjunction with FIGS. 1A and 1B.

Each of the client devices 220 can include at least one processor and a memory (e.g., a processing circuit). The memory can store processor-executable instructions that, when executed by the processor, cause the processor to perform one or more of the operations described herein. The processor can include a microprocessor, an ASIC, an FPGA, a GPU, a TPU, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 220 can include one or more computing devices or servers that can perform various operations as described herein. The one or more client devices 220 can include any or all of the components and perform any or all of the functions of the computer system 100 described herein in conjunction with FIGS. 1A-1D. The client devices 220 can be, or can be similar to, the client devices 102 described herein above in connection with FIGS. 1A-1D.

Each client device 220 can be a smartphone device, a mobile device, a personal computer, a laptop computer, a television device, a broadcast receiver device (e.g., a set-top box, a cable box, a satellite receiver box, etc.), or another type of computing device. Each client device 220 can be implemented hardware or a combination of software and hardware. Each client device 220 can include a display or display portion. The display can include a touchscreen display, a display portion of a television, a display portion of a computing device, a monitor, a GUI, or another type of interactive display (e.g., a touchscreen, a graphical interface, etc.) and one or more I/O devices (e.g., a touchscreen, a mouse, a keyboard, digital key pad). The display can present one or more user interfaces, such as the user interfaces described in connection with FIGS. 3A-3C, which can be dynamically updated based on selections and based on changes to in-game conditions (e.g., a state of a live sporting event has changed, etc.). The display can include a touch screen displaying an application, such as a web browser application or a native application, which may be used to access the functionality of the data processing system 205, as described herein.

The display can include a touch screen display, which can receive interactions from a player. The client device 220 may also receive interactions via any other type of I/O device. The interactions can result in interaction data, which can be stored and transmitted by the processing circuitry of the client device 220. The interaction data can include, for example, interaction coordinates, an interaction type (e.g., drag, click, swipe, scroll, tap, etc.), and an indication of an actionable object (e.g., an interactive user interface element, such as a button, hyperlink, etc.) with which the interaction occurred. The interaction data can identify a user interface element (e.g., including any of the user interface elements described in connection with FIGS. 3A-3C) with which the interaction occurred. In some implementations, interactions can cause the client device 220 to perform one or more operations specified by processor-executable instructions included in (or received by) a native application or web-browser. Instructions to update one or more user interfaces (e.g., the user interfaces shown in FIGS. 3A-3C) can be received from the data processing system 205, as described herein.

Each client device 220 can include an input device that couples or communicates with the display of each client device 220 to enable a player to interact with or select one or more actionable objects as described herein. The display can enable interaction with one or more visual indications provided through the display of each client device 220, and responsive to an interaction (e.g., select, click-on, touch, hover), the client device 220 can generate an indication identifying a user input or selection of a wager, a live event selection, one or more selections of combinations of conditional events 275, an indication to place a wager, or an interaction to request odds values for a selected combination of conditional events 275, among others.

Each client device 220 can include or be identified by a device identifier, which can be specific to each respective client device 220. The device identifier can include a script, code, label, or marker that identifies a particular client device 220. In some implementations, the device identifier can include a string or plurality of numbers, letters, characters, or any combination numbers, letters, and characters. In some embodiments, each client device 220 can have a unique device identifier. Each client device 220 can include a client application, which can be a web browser or a native application that communicates with the data processing system 205 to present and dynamically update user interfaces (e.g., the user interfaces 300A-300C of FIGS. 3A-3C), construct parlay wagers, generate one or more data records corresponding to a live event (e.g., a post, a wager, etc.), or other functionality described herein. The client application can be executing on each client device 220, and may be provided to the client device 220 by the data processing system 205 or from an application repository. The application can include a web application, a server application, a resource, a desktop, or a file.

The application can include a local application (e.g., local to a client device 220), hosted application, a SaaS application, a virtual application, a mobile application, or other forms of content. In some implementations, the application can include or correspond to applications provided by remote servers or third-party servers. In some implementations, the application can access the player profiles 270 or the conditional events 275 stored and maintained in the storage 215, and generate one or more interactive user interface elements, such as the interactive user interface elements described in connection with FIGS. 3A-3C, to a player when executed by a client device 220. Some example interactive user interface elements include user-selectable hyperlinks, buttons, graphics, videos, images, or other application features. Interactions with such interactive user interface elements (sometimes referred to as "actionable objects") can cause the application executing on the respective client device 220 to generate a signal, which can cause the application to perform further operations corresponding to the actionable object.

In some implementations, one or more client devices 220 can establish one or more communication sessions with the data processing system 205. A communication session can include a channel or connection between the data processing system 205 and a respective client device 220. The one or more communication sessions can each include an application session (e.g., virtual application), an execution session, a desktop session, a hosted desktop session, a terminal services session, a browser session, a remote desktop session, a URL session or a remote application session. Each communication session can include encrypted or secure sessions, which can include an encrypted file, encrypted data, or traffic.

In some implementations, in response to interactions with corresponding user interface elements, the application executing on a client device 220 can transmit information, such as player profile 270 information (e.g., changing player profile 270 parameters, changing login information, etc.), interaction information, selections of wager amounts, selections to request odds for combinations of conditional events 275 of live events (e.g., live sporting events, etc.), or selections to request conditional events 275 for current or upcoming live events, selections to request players, plays, or other attributes or potential actions that may occur during an identified live event, selections to construct a parlay wager that includes a number of potential outcomes of conditional events 275, among other selections described herein. For example, the client device 220 can transmit a request for one or more participants of a live event (e.g., athletes playing for a particular team during a live event, etc.). Additional requests may also be transmitted, including requests to place one or more wagers, execute one or more simulations to generate the samples 280 based on simulation results, or requests for information (e.g., available wagers, odds information, etc.) related to one or more live events, among others. The requests can be hypertext transfer protocol (HTTP or HTTPS) request messages, file transfer protocol messages, email messages, text messages, or any other type of message that can be transmitted via the network 210.

Figure 3A:
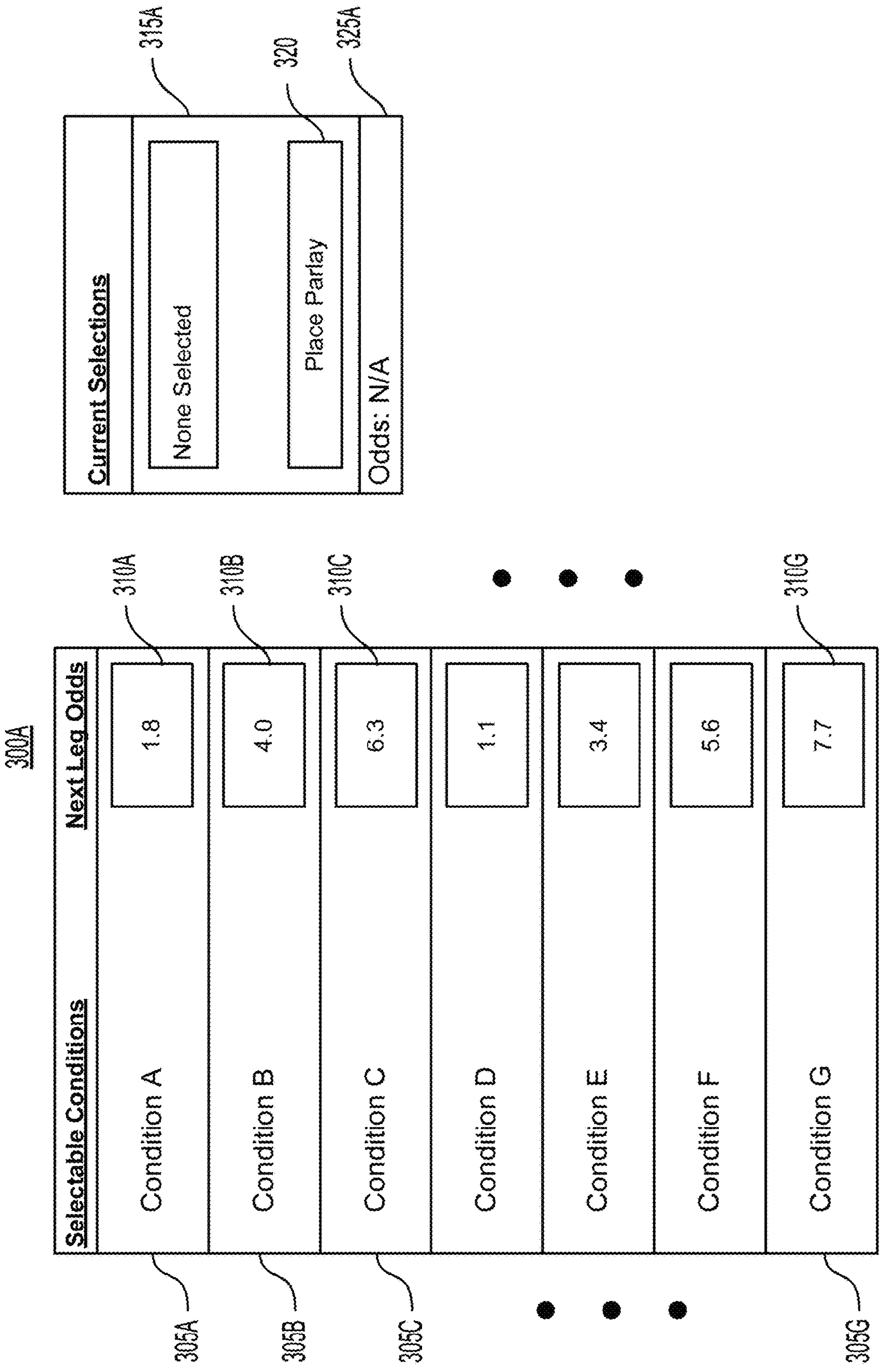
FIGS. 3A, 3B, and 3C illustrate example user interfaces that include probability values that are updated in real-time or near real-time based on user selections, in accordance with one or more implementations.
Figure 3B:
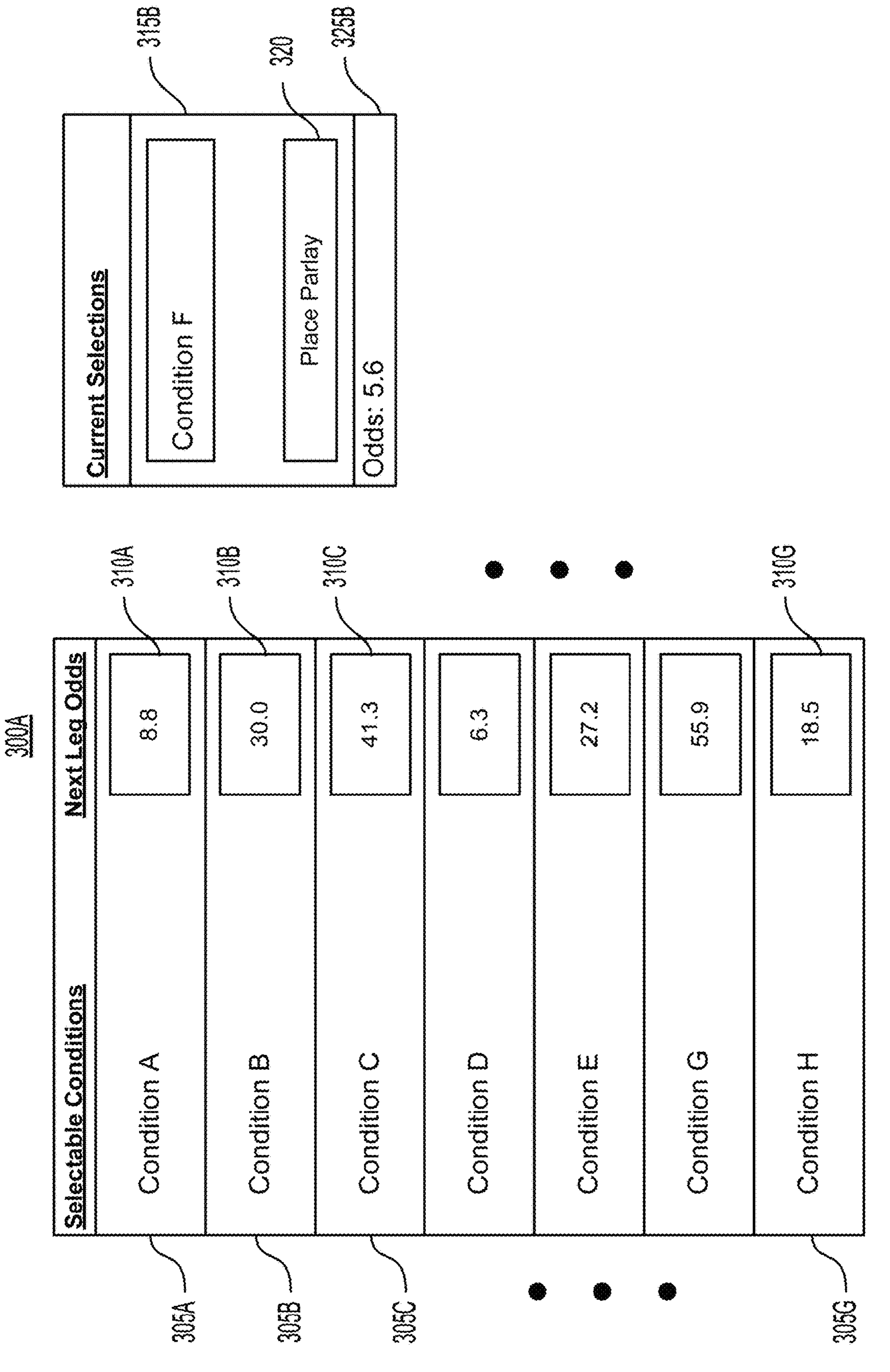
Figure 3C:
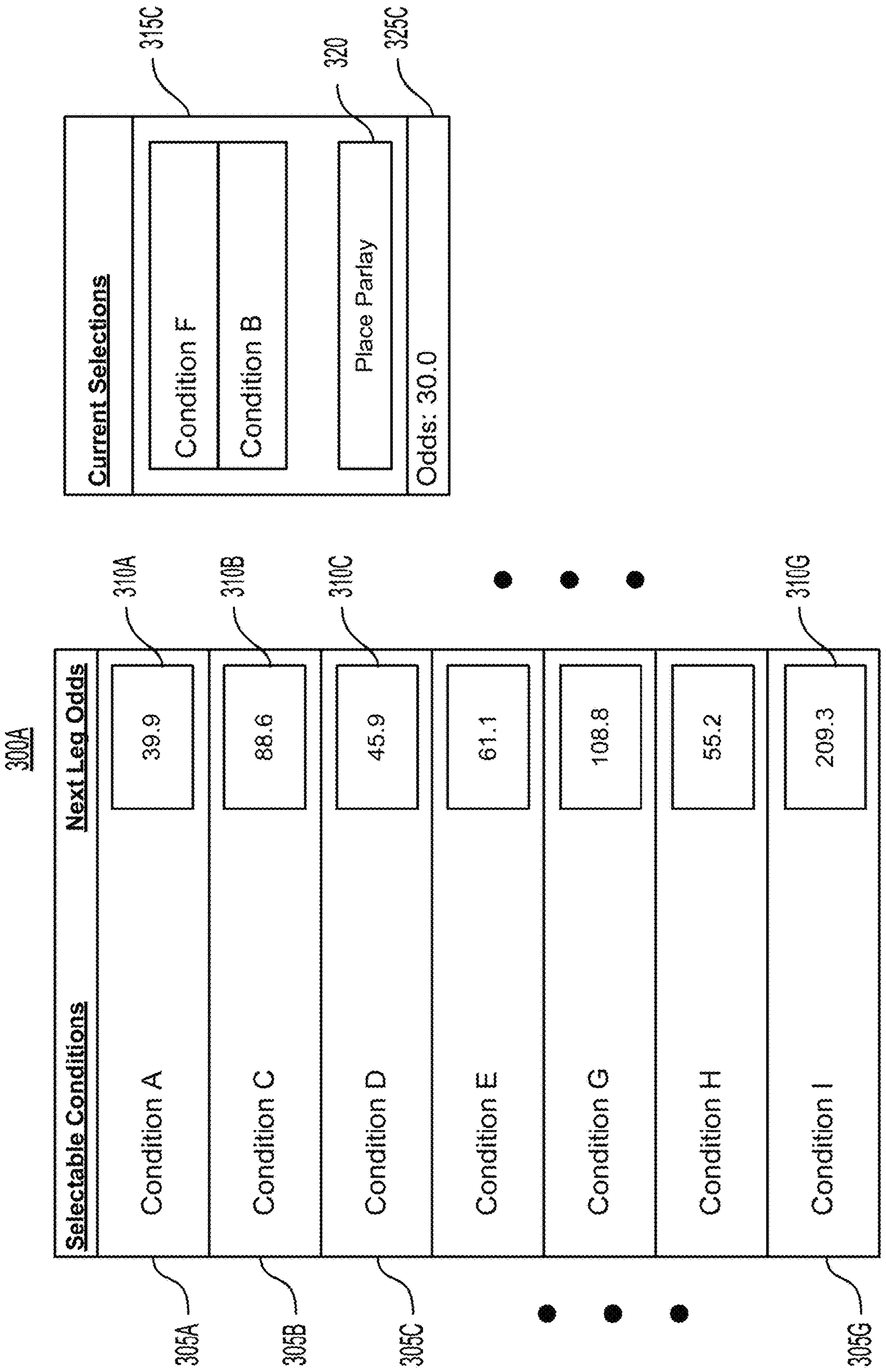

As described herein, a client device 220 can receive one or more interactions with actionable objects presented on the display of the client device (e.g., in the application executing on the client device 220, user interfaces similar to those shown in FIGS. 3A-3C). Interactions can be tap interactions, click interactions, or other types of indications that a user is engaged with a particular user interface element. Upon detecting an interaction with a particular user interface element, the client device 220 can execute instructions (e.g., processor-readable code, a script, etc.) that cause the client device 220 to transmit an appropriate signal to the data processing system 205. Additionally, the client devices 220 may receive and display one or more content items or interactive user interface elements that may correspond to one or more conditional events 275, one or more live events, one or more odds values, placing parlay wagers, as described herein.

In some implementations, the application interfaces can present a selectable list of live events (e.g., current or upcoming sporting events, etc.). Upon selection of a live event in the list, or upon receiving a request to perform a parlay wager, the data processing system 205 can provide one or more user interfaces similar to the user interfaces shown in FIGS. 3A-3C, which enable a user to select one or more combinations of conditional events 275, as described herein, to assemble parlay wagers. Upon a selection of at least one of the conditional events 275, the data processing system 205 can perform the various operations described herein to generate odds values in real-time or near real-time and dynamically update the application interfaces presented at the respective client device 220, as described herein.

The storage 215 can be a computer-readable memory that can store or maintain any of the information described herein. The storage 215 can store or maintain one or more data structures, which may contain, index, or otherwise store each of the values, pluralities, sets, variables, vectors, numbers, or thresholds described herein. The storage 215 can be accessed using one or more memory addresses, index values, or identifiers of any item, structure, or region maintained in the storage 215. The storage 215 can be accessed by the components of the data processing system 205, or any other computing device described herein, via the network 210. In some implementations, the storage 215 can be internal to the data processing system 205. In some implementations, the storage 215 can exist external to the data processing system 205, and may be accessed via the network 210. The storage 215 can be distributed across many different computer systems or storage elements, and may be accessed via the network 210 or a suitable computer bus interface. The data processing system 205 can store, in one or more regions of the memory of the data processing system 205, or in the storage 215, the results of any or all computations, determinations, selections, identifications, generations, constructions, or calculations in one or more data structures indexed or identified with appropriate values.

Any or all values stored in the storage 215 may be accessed by any computing device described herein, such as the data processing system 205, to perform any of the functionalities or functions described herein. In some implementations, a computing device, such as a client device 220, may utilize authentication information (e.g., username, password, email, etc.) to show that the client device 220 is authorized to access requested information in the storage 215. The storage 215 may include permission settings that indicate which players, devices, or profiles are authorized to access certain information stored in the storage 215. The storage 215 may be similar to or include the storage 128 described herein above in conjunction with FIG. 1C. In some implementations, instead of being internal to the data processing system 205, the storage 215 can form a part of a cloud computing system. In such implementations, the storage 215 can be a distributed storage medium in a cloud computing system and can be accessed by any of the components of the data processing system 205, by the one or more client devices 220 (e.g., via one or more user interfaces, etc.), or any other computing devices described herein.

The storage 215 can store one or more player profiles 270 in one or more data structures. Each player profile 270 can be associated with a corresponding player (e.g., a user) of a client device 220 that accesses the functionality of the data processing system 205. In implementations where the data processing system 205 can operate without using a client device 220 (e.g., a slot machine, a video game machine, a standalone wagering kiosk, etc.), a player profile 270 may correspond to a player that accesses the data processing system 205 to place wagers (e.g., parlay wagers). Each player profile 270 can be a user profile that includes information about a player. Each player profile 270 may include information about one or more of the client devices 220 used to access the data processing system 205 using the player profile 270. For example, identifiers of a player profile 270 can be used to access the functionality of the data processing system 205 via the network 210.

The identifiers of player profiles 270 can include a username, a password, an e-mail address, a phone number, a personal identification number (PIN), a secret code-word, or device identifiers for use in a two-factor authentication technique, among others. The player profile 270 can store information (e.g., outcomes, etc.) relating to historic wagers (e.g., including parlay wagers), historic selections of conditional events 275, historic games viewed or wagered upon using the player profile 270, and historic live event outcomes, or other information. The player profile 270 can store a credit balance or wager information (e.g., an amount of a wager, a timestamp associated with a wager, information about the presence of an indication to participate in a bonus opportunity using the wager, a client device identifier of a client device that was used to place the wager, wager types, parlay wager complexity such as the number of conditional events 275 in each parlay wager placed using the player profile 270, etc.).

The player profile 270 can store information about a client device 220 used to access the data processing system 205 such as an internet protocol (IP) address, a media access control (MAC) address, a global unique identification (GUID), a player profile 270 name (e.g., the name of a user of the client device 220, a player-chosen username, etc.), device name, among others. In some implementations, a player profile 270 can be created by the data processing system 205 in response to a creation request transmitted by a client device 220. The player profile 270 creation request can include any of the player profile 270 information described herein. In some implementations, a client device 220 accessing the data processing system 205 may not be associated with a player profile 270. In such implementations, the data processing system 205 can automatically create a player profile 270 using an identifier of the client device 220 provided by the client device 220, or transmit a notification to the client device 220 to prompt a creation request for a player profile 270.

The storage 215 can store or maintain one or more conditional events 275 associated with one or more samples 280 for one or more live events (e.g., current or upcoming sporting events). The conditional events 275 can be stored in one or more data structures. The conditional events 275 can correspond to any action or event that may occur in a live game (e.g., a live event). One example of a conditional event 275 is "who will score the first touchdown in an upcoming football game" (e.g., there can be only one first touchdown scorer). Other types of conditional events 275 are also possible (e.g., which team will score the next point, who will win the game, which player will score the next point, etc.). Any outcome that may occur during a live event on which a wager can be placed can be stored as a respective conditional event 275. Conditional events 275 can be utilized to construct parlay wagers via the user interfaces described herein (e.g., user interfaces similar to those described in connection with FIGS. 3A-3C, etc.). As used herein, the term "live event" any type of upcoming or in-play (e.g., current) live event.

Each conditional event 275 may be generated or predetermined and stored in the storage 215 such that they are accessible by the components of the data processing system 205. In an embodiment, one or more conditional events 275 may be generated based upon one or more conditional event templates for a live event type (e.g., a type of sporting event, etc.). Prior to an upcoming live event, the data processing system 205 (or any components thereof) may generate one or more conditional events 275 for the upcoming live event by applying one or more templates to the attributes of the upcoming live event (e.g., which athletes are participating in the live event, which teams are playing in the live event, possible outcomes of the live event, etc.). Respective sets of conditional events 275 can be stored in the storage 215 for each live event in association with a respective identifier of the live event. Each set of conditional events 275 can correspond to potential outcomes that may occur during the live event. Some example conditional events 275 that may correspond to an example football game include which athlete will score the first touchdown, which athlete will score the second touchdown, which team will win the game, or which team will have a greater score at halftime, among others. It should be understood that other conditional events are also possible for other types of live events (e.g., baseball games, hockey games, basketball games, other types of live events, etc.). A conditional event 275 can be any type of event or potential outcome on which a wager can be placed.

The data processing system 205 can store one or more data records in the storage 215, for example, in one or more data structures. As described herein, the client device 220 can transmit interaction data to the data processing system 205 in response to placing a wager via one or more application interfaces (e.g., a parlay wager using the selections described in connection with FIGS. 3A-3H). The wager information in the interaction data can include, for example, any input information as part of the wager (e.g., wager amounts, selections of outcomes for one or more conditional events 275, etc.), the player profile 270 associated with the client device 220, a wager type (e.g., parlay wager, etc.), an identifier of a live event corresponding to the wager, a wager identifier, or any other information relating to the wager. Upon receiving the interaction data, the data processing system 205 can store the interaction data as a data record, in association with the player profile 270 that was used to provide the interaction data. The data records can be records of wagers, requests to modify a player profile 270, or any other data relating to live events that may be provided via an interaction at a client device 220. In some implementations, the data processing system 205 can store the data record in association with one or more identifiers of a live event or a wagering opportunity of the live event identified in the interaction received from the client device 220.

The storage 215 can store or maintain one or more samples 280 of a joint-probability distribution of possible combinations of outcomes of the conditional events 275 for one or more live events. The samples can be or can include simulation results associated with one or more corresponding conditional events 275, for example, in one or more data structures. The samples 280 can be generated from simulations of one or more live events (e.g., sports game simulations), which may be executed by the data processing system 205 or by another external computing system (not pictured). Each live event can be associated with multiple sets of simulation results 280, with each set of simulation results 280 including respective outcomes for each conditional event 275 that may occur during the live event. The set of samples 280 for a live event can be generated based on simulation results from one or more respective simulations of the live event.

A run of simulations (e.g., a predetermined number of simulations of a future live event or a remainder of a live event, if the live event is ongoing) can occur in response to a condition. In some implementations, the number of simulations executed for a future live event or a remainder of a live event may be dynamic. For example, simulations may be executed until a condition is met (e.g., simulating as many runs as possible until a time budget is met, until a variance in generated results is met, etc.). Some example conditions for executing a set of simulations include if a team scores, a player becomes injured, if an outcome corresponding to a conditional event 275 occurs, or if a state of the live event changes, among others. The simulations of the live event can be executed in an offline process (e.g., by an external computing system) or by the data processing system 205 in response to detecting the condition (or receiving an indication from another computing system that the condition to execute the simulations has been satisfied). The simulations of the live event can occur separately from requests to construct or place parlay wagers, as described herein.

The results from each run of simulations is a corresponding set of (high dimensionality) samples 280 from the joint-probability distribution describing all wagering selections. The outcomes of the simulations may depend partially on an element of randomness, and may be based on various aspects of the particular live event, the teams and athletes participating in the live event, and any other attribute or characteristic that may influence any outcome that may occur during the live event. As such, each set of samples 280 generated from a run of simulations may include different outcomes for the conditional events 275 of the simulated live event. An example data structure representation of the samples 280 generated from simulations of conditional events 275 of a live event is shown below in Table 1.

TABLE 1

| | Simulation Number | | | | | | | | | |
|---|---|---|---|---|---|---|---|---|---|---|
| | 1 | 2 | 3 | 4 | 5 | 6 | 7 | 8 | 9 | 10 |
| Conditional Event #1 | A | B | C | D | A | B | C | D | A | C |
| Conditional Event #2 | B | B | A | B | A | C | D | A | C | A |

As shown in Table 1 above, the samples 280 generated from simulation results for a live event may be organized according to various conditional events 275 that may occur during the live event. In Table 1, each simulation 1, 2, 3, etc. corresponds to a respective simulation of the live event, and the values A, B, C, and D correspond to simulated outcomes of the respective conditional event 275 for that row of the table. As such, each column represents a respective outcome for any possible parlay wager involving conditional events 275 evaluated in the respective simulation. With enough simulations executed, the samples 280 can be generated with high dimensionality, and therefore be utilized to generate odds values for a selected set of outcomes in a parlay wager.

The components of the data processing system 205 can utilize the simulation results 280 to calculate odds values for parlay wagers involving multiple conditional events 275. Although only ten simulation results are shown in Table 1, it should be understood that hundreds, thousands, tens of thousands, hundreds of thousands, or millions of simulations may be executed for a live event, with corresponding outcomes for each conditional event 275 that occur in each simulation being recorded as part of the simulation results 280. Likewise, the example A, B, C, and D outcomes are provided purely for example purposes. It should be understood that any number of potential outcomes can occur for a conditional event 275, and that different conditional events 275 may have different numbers of potential outcomes. When a new run of simulations is executed for a live event, the components of the data processing system can update the samples 280 indicating the possible outcomes of conditional events 275. For simulations executed during the live event, conditional events 275 for which an outcome has already occurred in the live event need not be simulated, and may not be included in the updated samples 280 for the live event. When samples 280 for a live event are updated, the data processing system 205 can dynamically update user interfaces at client devices 220 making selections for a parlay wager, as described herein.

Referring now to the operations of the data processing system 205, the sample identifier 230 can identify a set of samples 280 of a joint-probability distribution of one or more conditional events 275 to occur during a live event. For example, the sample identifier 230 can maintain one or more data structures for each set of samples 280 for a live event that include outcomes of conditional events 275 stored in association with an identifier of the live event. In some implementations, the set of samples 280 can include one or more probability values for the conditional events 275 (e.g., calculated by dividing the number of occurrences of a particular outcome of a conditional event 275 in the set of samples 280 by the total number of simulations executed to generate the set of samples 280, etc.). In some implementations, the sample identifier 230 can generate samples from the joint-probability distribution of the plurality of conditional events based on the data structure. The samples from the joint-probability distribution can be represented by the samples 280 shown in Table 1, for example. Generating the samples 280 can include executing one or more simulations of a live event, or retrieving simulation results from another computing system (not shown) and generating a data structure that includes simulated outcomes for each conditional event 275 that can occur during the corresponding live event. The sample identifier 230 can scan through the simulation results to identify outcomes of one or more conditional events 275 associated with the live events, and can generate a data structure (e.g., similar to that represented by Table 1, etc.) corresponding to the samples 280.

In some implementations, the sample identifier 230 can itself generate the simulation results 280 for a live event by executing simulations of the live event. In implementations where the sample identifier 230 does not execute the simulations, the sample identifier 230 can transmit a request to another computing system to execute the simulations, or poll another computing system for updated simulation data. As described herein, a simulation of a live event can be a model of the event and can produce one or more outputs that correspond to various outcomes of conditional events 275 that can occur during the live event. For example, if the live event is a sporting event, the outcomes may include timestamps of simulated game events (e.g., points scored, passes made, etc.), along with identifiers of participants (e.g., athletes, teams, etc.) that performed the simulated game event or conditions that were satisfied corresponding to the game event.

Executing the simulations can include executing processor-readable instructions that cause the sample identifier 230 (or another computing system) to carry out a model of the live event, with the outputs of the simulation being accessed to generate respective samples 280 for of the conditional events 275 that may occur during the live event, as described herein. Each simulation used to generate the samples 280 may depend partially on an element of randomness (e.g., one or more random numbers generated using one or more random number generators), and may be based on various aspects of the particular live event, such as the teams and athletes participating in the live event or any other attribute or characteristic that may influence any outcome that may occur during the live event. As such, the samples 280 generated from each simulation may include different outcomes for the conditional events 275 of the simulated live event.

A predetermined number of simulations can be executed for the live event, for example. The predetermined number may be specified in one or more requests from an external computing device (e.g., a client device 220, an administrative computing system, an operator of the data processing system 205, etc.). In some implementations, the number of simulations executed for the live event may be dynamic. For example, simulations may be executed until a condition is met (e.g., simulating as many runs as possible until a time budget is met, until a variance in generated results is met, etc.). In some implementations, the sample identifier 230 can generate counter values for each outcome of each conditional event 275 of the live event to which the simulations correspond. The counter values can correspond to a frequency with which a particular outcome of a conditional event 275 (or combination of outcomes of multiple conditional events 275) occurs in the samples 280.

The simulations of the live event can be executed as an offline process (e.g., prior to the live event, not in real-time or near real-time, etc.), or may be executed during the live event (e.g., to simulate a remainder of the live event based upon what has already occurred in the live event, based upon changes to conditions of the live event, etc.). The sample identifier 230 can determine whether there is a change to the samples 280 (e.g., by detecting a change to a condition of a live event and executing a new run of simulations, receiving a request for new simulations from an external computing system, receiving new simulation results of the live event from an external computing system, etc.). If a change to the samples 280 is detected, the sample identifier 230 can communicate with the various components of the data processing system 205 to dynamically update user interfaces displayed at client devices 220 accessing the data processing system 205 to place parlay wagers, as described herein.

The user interface provider 235 can provide, for presentation at a client device 220, a user interface comprising one or more user interface elements. Each user interface element can indicate an outcome of a respective conditional event 275 of an upcoming or active (e.g., on-going) live event. The user interfaces can be provided, for example, via a web-based interface or to an native application executing on a client device 220 that retrieves display instructions (or data to display) from the data processing system 205. As described herein, particular wagers, such as parlay wagers, can include wagers on multiple conditional events. The odds values for such wagers can be calculated across correlated markets, containing a number of outcomes of conditional events 275. The client device 220 can access a webpage or application resource provided by the data processing system 205 to make selections of combinations of outcomes for one or more conditional events 275 to occur during a live sporting event.

The user interface provider 235 may include a webserver or repository of display data that can translate information in the storage 215 to displayable data. For example, the user interface provider 235 can generate display instructions (e.g., HTML, JavaScript, etc.) that cause a client device to display one or more user interfaces similar to those described in connection with FIGS. 3A-3C. The user interface(s) can be provided to a client device 220, for example, in response to a request to assemble a parlay wager for one or more live events. The request can be transmitted in response to an interaction with a corresponding user interface element at an application executing at a client device 220, for example.

Referring to FIG. 3A in the context of the components described in connection with FIG. 2, illustrated is an example user interface 300A showing probability values for conditional events 275 that can be updated by the data processing system in real-time or near real-time in response to selections and changes in the state of the corresponding live event. The user interface 300A enables a player to select an outcome for various conditional events 275. As shown, the conditional events are shown in the corresponding user interface elements 305A-305G (sometimes referred to as the "user interface element(s) 305"). Any number of user interface elements 305 can be provided for display, for example, depending on the number of outcomes for conditional events 275 selected. As shown, each of the user interface elements 305 indicates a respective condition (e.g., a potential outcome on which a wager can be placed). In addition, each of the user interface elements 305A-305G includes a respective one of the odds values 310A-310G (sometimes referred to as the "odds value(s) 310"). The odds value(s) can be (or may be calculated based on) the probability of the respective outcome of a conditional event 275 occurring in the live event. In some implementations, the odds values 310 may be money line values, percentage probability values, or other types of values that indicate a relative chance of the respective outcome occurring during the live event.

Each of the user interface elements 305 can corresponding to a respective outcome (labeled in the figure as "Condition A," "Condition B," etc.). In some implementations, each of the user interface elements 305 can correspond to a respective conditional event, and upon selection (e.g., an interaction) with a user interface element 305, one or more possible outcomes for the selected conditional event 275, along with corresponding odds values 310 for each outcome, can be displayed in the user interface 300A. In some other implementations, a search bar that can accept text input from the client device 220 can be included in the user interface 300A. When text is entered (and in some implementations, an additional search interaction is provided), the client device 220 can transmit a request to from the conditional events 275 (or outcomes of the conditional events 275) for the live event on which the parlay wager is being placed. In response to the search request, the data processing system 205 can search and return a list of conditional events 275 (or potential outcomes of conditional events 275), and display the search results in one or more user interface elements 305.

The user interface 300A can include a bet slip 315A, which includes an indication that no potential outcomes of conditional events 275 for the parlay wager have yet been selected. As such, the current odds 325A for the parlay wager are shown in the bet slip 315A as "N/A". The bet slip 315A includes an interactive button labeled "Place Parlay,"

which when interacted with, causes the client device 220 to transmit a request to the data processing system 205 to place the parlay wager including any selected outcomes of conditional events 275, as described herein. Each of the user interface elements 305 can be interactive. Upon selection of one of the user interface elements 305, the outcome of the conditional event 275 corresponding identified by the user interface element 305 can be added to the bet slip (e.g., by transmitting a corresponding request to the data processing system 205).

In this example, because no outcomes have yet been selected for the parlay wager, each user interface element 305 shows the respective odds values 310 only the respective outcome identified by the user interface element 305 alone. The probability of a respective outcome being satisfied during the live event can be calculated by dividing the number of the subset of samples 280 in which the outcome occurs by the total number of simulations of the corresponding live event. The odds value (e.g., a payout multiplier, money line, etc.) can then be calculated based on this probability, and displayed as a respective odds value 310 in a corresponding user interface element 305. If the samples 280 are updated (e.g., based on changes to the state of the live event, additional simulations of the live event being executed, etc.), the data processing system can dynamically update the odds values by re-calculating the respective probability values for each outcome, as described herein.

Referring back to FIG. 2, the selection receiver 240 can receive, from the client device 220, a first selection of a first user interface element (e.g., a user interface element 305) corresponding to an outcome of a first conditional event 275. The interaction can be a tap interaction, a drag interaction, or any other type of interaction that signifies a selection of a corresponding outcome of a conditional event 275 to occur during the live event on which the parlay wager will be placed.

The selection can be received, for example, via the user interface (e.g., user interfaces provided by the data processing system similar to those described in connection with FIGS. 3A-3C, etc.) presented at the client device 220 by the user interface provider 235. As described herein, particular wagers, such as parlay wagers, can include wagers on multiple conditional events. The odds values (e.g., the odds values 310) for such wagers can be calculated across multiple correlated markets, containing a number of outcomes of conditional events. Parlay wagers are assembled from multiple potential outcomes that can occur during the live event. The techniques described herein enable real-time or near real-time updates to the odds values (e.g., the odds values 310) of a parlay wager should an additional chosen outcome of a conditional event 275 (e.g., represented by a respective user interface element 305) be selected by a user. Upon receiving a selection of a particular user interface element, the selection receiver 240 can update the bet slip to include the selected outcome of the corresponding conditional event 275 for the live event. The bet slip can be stored in association with the player profile 270 used by the client device 220 to access the functionality of the data processing system 205.

In some implementations, upon receiving a request to begin assembling a parlay wager from the client device 220, the selection receiver 240 can establish a session for the parlay wager by allocating a corresponding region of memory in the storage 215 of the data processing system 205, and storing any selections made in the receiver. Upon receiving an indication of a selection of a user interface element (e.g., a user interface element 305), the probability generator 245 can generate updated probabilities for each unselected user interface element presented at the client device, were each unselected user interface element selected for inclusion in the parlay wager. This enables the player to be able to view, in real-time or near real-time, the prospective odds of the parlay wager for a variety of different "next legs," or next selected outcomes, before actually making a selection.

The probability generator 245 can dynamically generate, based on the set of samples 280 and responsive to the first selection, for each outcome of each conditional event 275 that can be selected for the parlay wager during the session created for the user, a respective probability that indicates the total odds of the parlay wager were the respective outcome included in the parlay wager. To do so, the probability generator 245 can iterate through each of the unselected outcomes of conditional events 275 that could be selected for the parlay wager (e.g., which in some implementations may only include the outcomes of conditional events 275 displayed in respective user interface elements of the user interface, or in some implementations may include all selectable outcomes or a subset of selectable outcomes), and can calculate a respective probability value for the parlay wager as if the respective unselected outcome were included in combination with the selected outcomes on the player's bet slip.

To calculate the probability of the parlay wager (including the additional unselected outcome), the probability generator can divide the number of the subset of samples 280 (e.g., simulations) in which the combination of outcomes including the unselected outcome are satisfied by the total number of simulations of the corresponding live event. Because a large number of simulations are executed for the live event, the percentage of the simulations in which the conditions of the parlay wager (including the respective additional unselected outcome of the conditional event 275) occur is representative of the odds of the conditions of the parlay wager being satisfied in the live event. In some implementations, the probability generator 245 can update the odds values in response to an indication that the samples 280 of the joint-probability distribution of outcomes of conditional events 275 has changed. For example, the probability generator 245 can identify an update to samples 280 of the joint-probability distribution (e.g., by detecting a change to the samples 280, receiving a signal from an external computing system that executes simulations or provides simulation results, by polling said external computing system, etc.). If a change (e.g., an update) in the samples 280 is detected, the probability generator 245 can dynamically update the respective probability value for the combined selection of conditional events of the parlay wager (including the respective unselected outcome) using the updated samples 280.

The probability generator 245 can repeat this process for each selection of an additional selected outcome for the parlay wager. For example, if the player selects another outcome of a conditional event 275 for inclusion in the parlay wager, the probability generator 245 can again iterate through each remaining unselected outcome of conditional events 275, and dynamically generate odds values as if the respective unselected outcome were included in the parlay wager. This enables the player to view both the odds of the currently selected combination of outcomes for the parlay wager, and the odds of the parlay wager should any additional outcome be selected for inclusion in the parlay wager (e.g., the next leg). Because the calculation of these odds values (e.g., the odds values 310) is performed by filtering the samples 280, the probability generator 245 can perform these operations in real-time or near real-time for large numbers of client devices. The probability generator 245 can maintain a filtered list of samples 280 in the session (e.g., associated with the player profile 270) for the parlay wager, such that the probability generator 245 need only filter the subset of samples 280 (e.g., simulation results) in which the current selection of outcomes of conditional events 275 have occurred. The filtered list of samples 280 may be updated in response to additional selections (as described herein) or in response to an update to the samples 280 generated from simulations of the corresponding live event.

In some implementations, the probability generator 245 can calculate the odds values (e.g., the odds values 310) as described herein, but further based on a margin value. For example, when calculating the odds values for a combination of outcomes of conditional events 275, the probability generator 245 a respective margin value based on the respective probability value the combination (calculated by dividing the number of the subset of samples 280 in which the combination of outcomes including the unselected outcome are satisfied by the total number of simulations of the corresponding live event). In some implementations, the margin value can be calculated further based on a number of selections of outcomes of conditional events received from the client device 220 (e.g., a number of conditions for the parlay wager). For example, a parameter of the margin calculation function can discount the amount of margin added as the leg count (e.g., number of selected outcomes for the parlay wager) increases. In some implementations, the margin value can be calculated further based on at least one of a minimum margin threshold or a maximum margin threshold. The function utilized to calculate the margin can be a skewed curve, for example. In some implementations, the functions utilized to calculate the margin can take into account both the margin applied to each "single" in a parlay wager, the correlations between selections in the parlay wager, and optional tunable parameters related to margin "aggression." The implied probability (or values calculated therefrom) can be provided as odds values presented in one or more content items or user interface elements for the parlay wagers as described herein. In some implementations, tunable factors may be added to control margin "aggression." In some implementations, the margin may be adjusted after calculating the implied probability of the parlay wager (e.g., as a function of the number of legs, etc.).

Figure 5A:
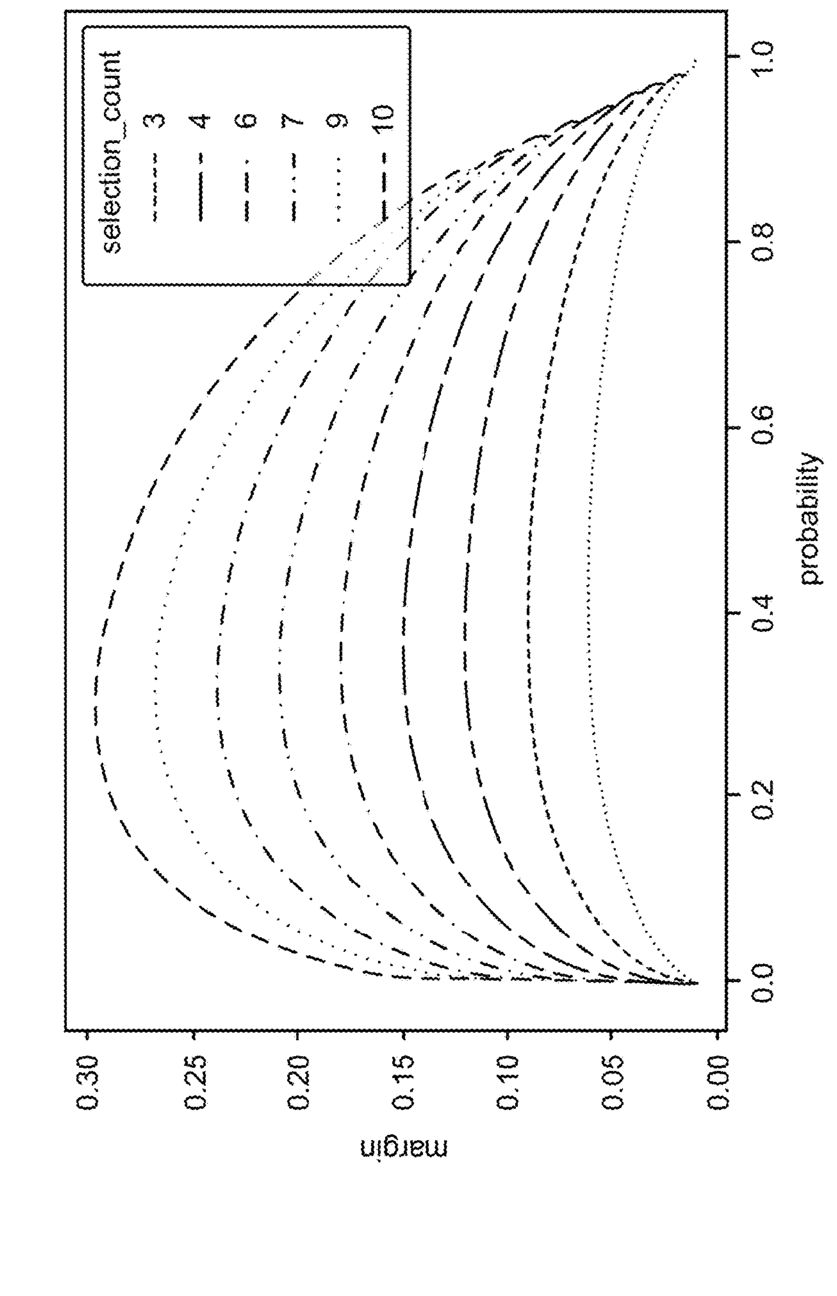
FIGS. 5A, 5B, 5C, and 5D illustrate example graphs showing relationships between dynamically generated margin values and numbers of legs in parlay wagers, in accordance with one or more implementations.
Figure 5B:
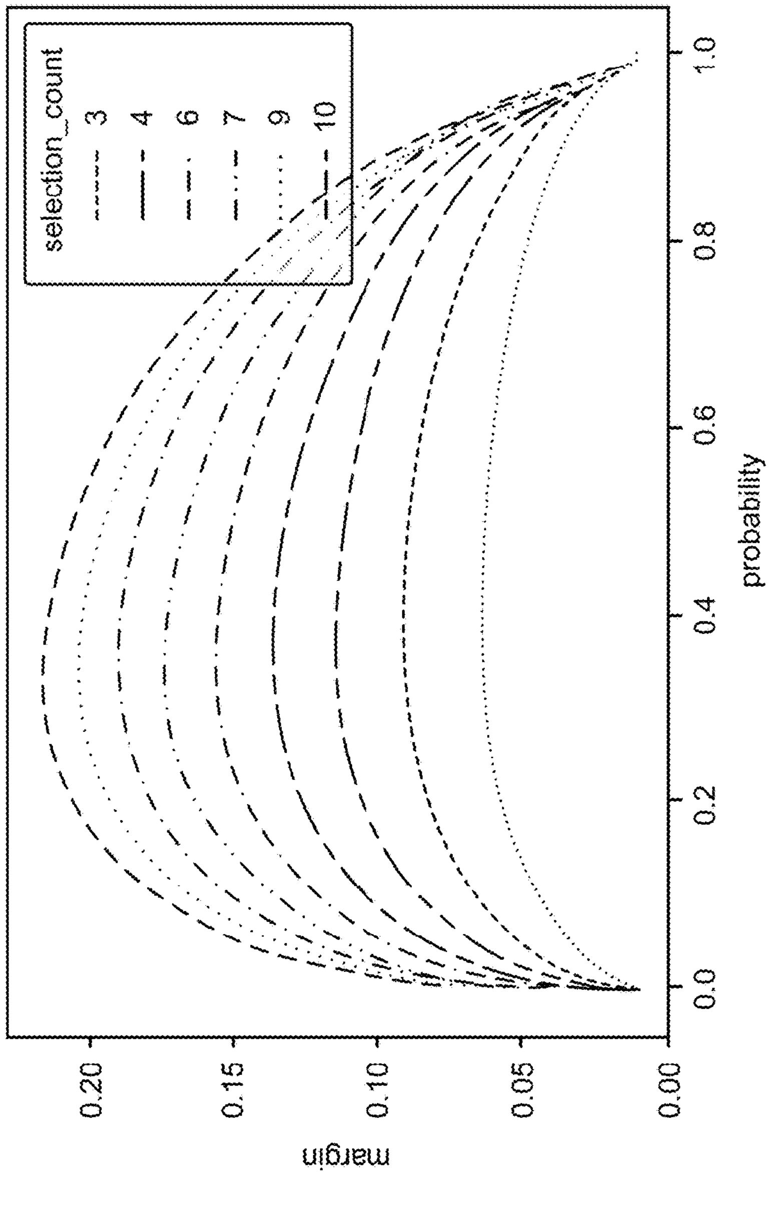
Figure 5C:
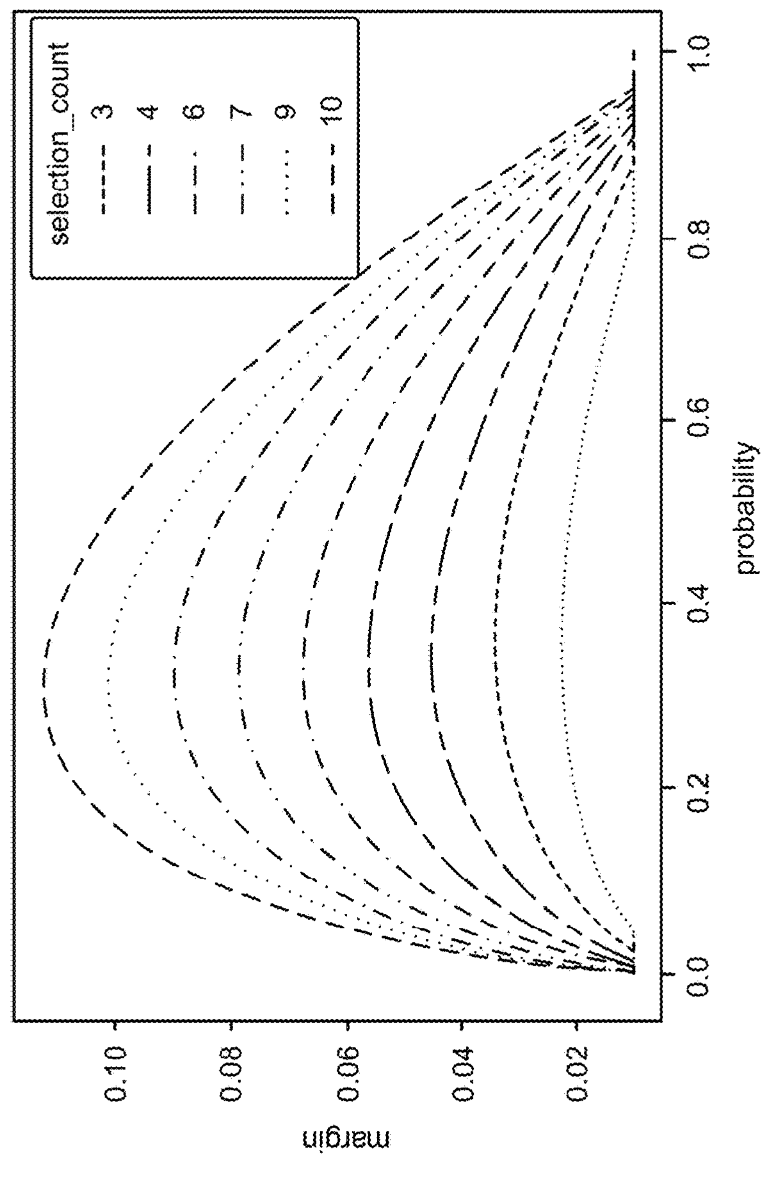
Figure 5D:
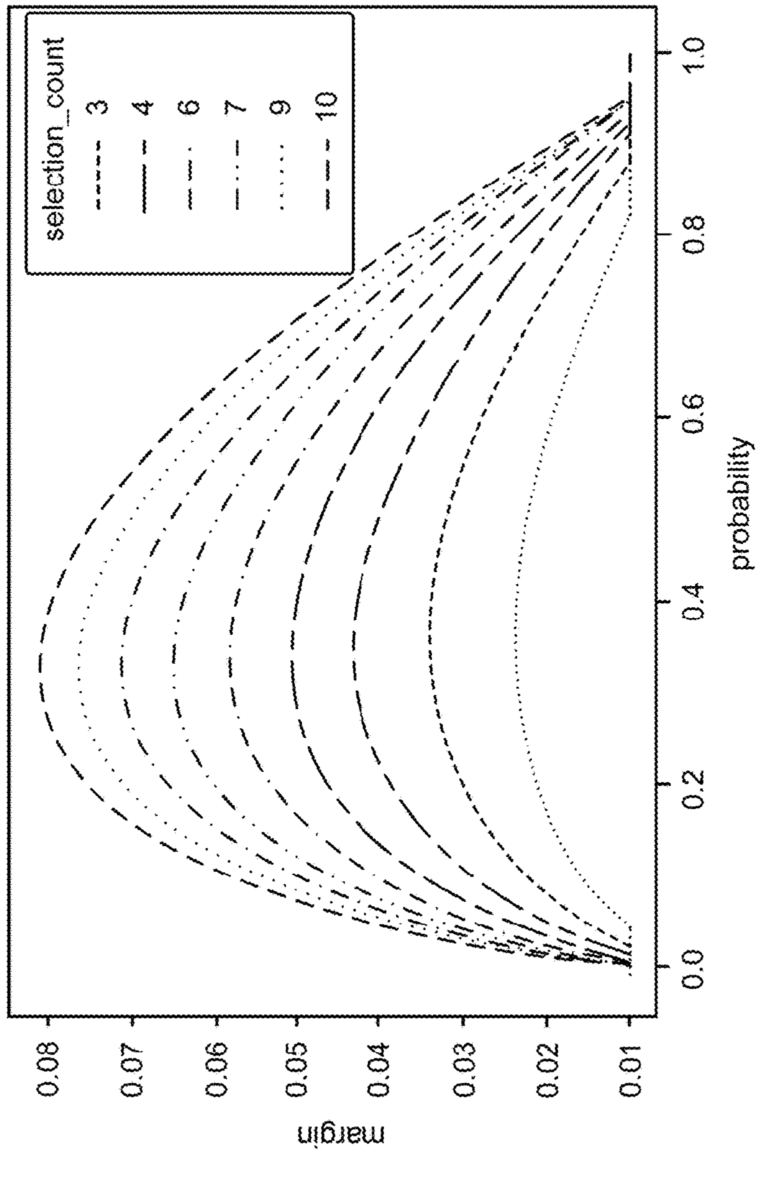

Examples of relationships between margin values and numbers of outcomes (e.g., legs) selected for parlay wagers are shown in FIGS. 5A-5D. Referring to FIG. 5A, illustrated is an example graph 500A showing a skewed margination approach. As shown in the graph 500A, the margin added ranges from about 0.01 to about 0.3, and is a function of the number of selected legs for the parlay wager and the probability of the parlay wager. Referring to FIG. 5B, illustrated is an example graph 500B, which shows a similar function as that shown in the graph 500A, but with discounting for larger numbers of legs. Referring to FIG. 5C, illustrated is an example graph 500C showing a power method approach to calculating margination. As shown in the graph 500C, the margin added ranges from about 0.01 to about 1.1, and is a function of the number of selected legs for the parlay wager and the probability of the parlay wager. Referring to FIG. 5D, illustrated is an example graph 500D, which shows a similar function as that shown in the graph 500C, but with discounting for larger numbers of legs.

Referring back to FIG. 2, the probability generator 245 can apply any suitable function to the probability and number of selected legs (e.g., number of selected outcomes) to calculate the overall odds values (e.g., for each potential combination of selected outcomes for the parlay wager. The margination can be any suitable process resulting in output that is similar to the graphs shown in FIGS. 5A-5D, and is a function of the number of legs and the overall probability of the conditions of the parlay wager occurring during the live event. In some implementations, the odds values may be calculated without applying a margin value.

Once the odds values have been calculated for each selectable combination of outcomes of conditional events 275 for the parlay wager, the update provider 250 can provide instructions to update the user interface to include a respective indicator corresponding to the respective probability value (e.g., the odds values 310) for each additional conditional event 275 that can be selected for a parlay wager. The combined selection of conditional events 275 for which the probability values are calculated and presented can include the first selected outcome of the first conditional event 275 and each other outcome of one or more conditional events 275 that can be selected for a parlay wager. The instructions can be, for example, display instructions that cause the native application or web-browser to display updated odds values 310 in the corresponding user interface elements 310. In some implementations, the update provider 250 can transmit the updated odds values as they are calculated by the probability generator 245 to the respective client device that is currently assembling a parlay wager (e.g., displaying the user interface to select outcomes for inclusion in the parlay wager), with an indication to update the user interface to display the odds values. The updates may be transmitted in response to a respective request from the client device 220 (e.g., which may be polling the data processing system 205 at various intervals for updates to the odds values for the parlay wager, etc.).

An example user interface with updated odds values is shown in FIG. 3B. Referring to FIG. 3B in the context of the components of the system 200 described in connection with FIG. 2, illustrated is an example user interface 300B, which includes the user interface 300A after a user interface element 305 has been selected by a player for inclusion in the parlay wager. As shown, the bet slip 315B has been updated to show outcome of the conditional event 275 that was selected (e.g., here, the "Condition F") for the parlay wager, and shows the current odds 325B for the parlay wager with these selections (here, "5.6"). Also as shown, the odds values 310 of the remaining outcomes of conditional events shown in the user interface elements have been updated to reflect the odds value of the parlay wager should the respective user interface element 305 be selected (e.g., and thus including the respective outcome of the respective conditional event 275 as part of the parlay wager). This enables a player to view the odds of a number of different "next legs" for a potential parlay wager at the same time as the parlay wager itself.

In some implementations, the data processing system 205 or the client device 220 can dynamically sort the user interface elements 305 according to the dynamically updated odds values 310 (e.g., high to low, low to high, etc.). In some implementations, the data processing system 205 or the client device 220 can dynamically sort the user interface elements 305 based on other characteristics (e.g., attributes of the respective conditional event 275 associated with the respective user interface element 305, etc.). The user interface 300B can again be updated in response to an additional selection of a user interface element by the player, or in response to a change in the samples 280 from which the odds values 310 are calculated. FIG. 3C shows an example of the user interface 300B after an additional selection of a user interface element 305.

Referring to FIG. 3C in the context of the components of the system 200 described in connection with FIG. 2, illustrated is an example user interface 300C, which includes the user interface 300C after an additional user interface element 310 has been selected by a player for inclusion in the parlay wager. As shown, the bet slip 315C has been updated to show both outcomes of conditional events 275 that were selected (e.g., here, "Condition F" and "Condition B") for the parlay wager, and shows the current odds 325C for the parlay wager with these selections (here, "30.0"). The odds value for the parlay wager has been updated on the bet slip 315C to reflect the odds of both "Condition F" and "Condition B" occurring during the live event, which is the same as the odds value 310B that was displayed in the user interface element 305B in FIG. 3B (e.g., the potential "next leg" odds value for "Condition B").

Although the user interface elements 305 corresponding to "Condition F" and "Condition B" are shown as removed from the user interfaces 300B and 300C, respectively, it should be understood that in some implementations, the respective user interface element 305 may still be displayed in the user interface after selection (e.g., when the outcome of the respective conditional event 275 can occur more than once during the live event, with multiple selections indicating that the selected outcome will occur the selected number of times to satisfy the parlay wager, etc.).

Referring back to FIG. 2, after presenting the updated odds values (e.g., the odds values 310) at a user interface, the update provider 250 can receive a request to place the parlay wager (e.g., which may be transmitted by the client device 220 in response to an interaction with the button 320 shown in FIGS. 3A-3C). The request to place the parlay wager can include a wager amount, and the selections of outcomes for conditional events 275 that were selected as part of the parlay wager using the techniques described herein. The update provider 250 can generate a data record corresponding to the parlay wager, which can be stored in association with the respective player profile 270 used to access the functionality of the data processing system 205. The update provider 250 can monitor the status of the live event to determine whether all of the conditions of the parlay wager are satisfied. If the conditions are not satisfied during the live event, the update provider 250 can update the data record of the parlay wager indicating that the wager was lost. If the conditions of the parlay wager were satisfied, the update provider 250 can update the data record to indicate the player won the parlay wager. The update provider 250 can calculate a payout amount based on the total odds value for the parlay wager and based on the amount wagered on the parlay wager.

Figure 4:
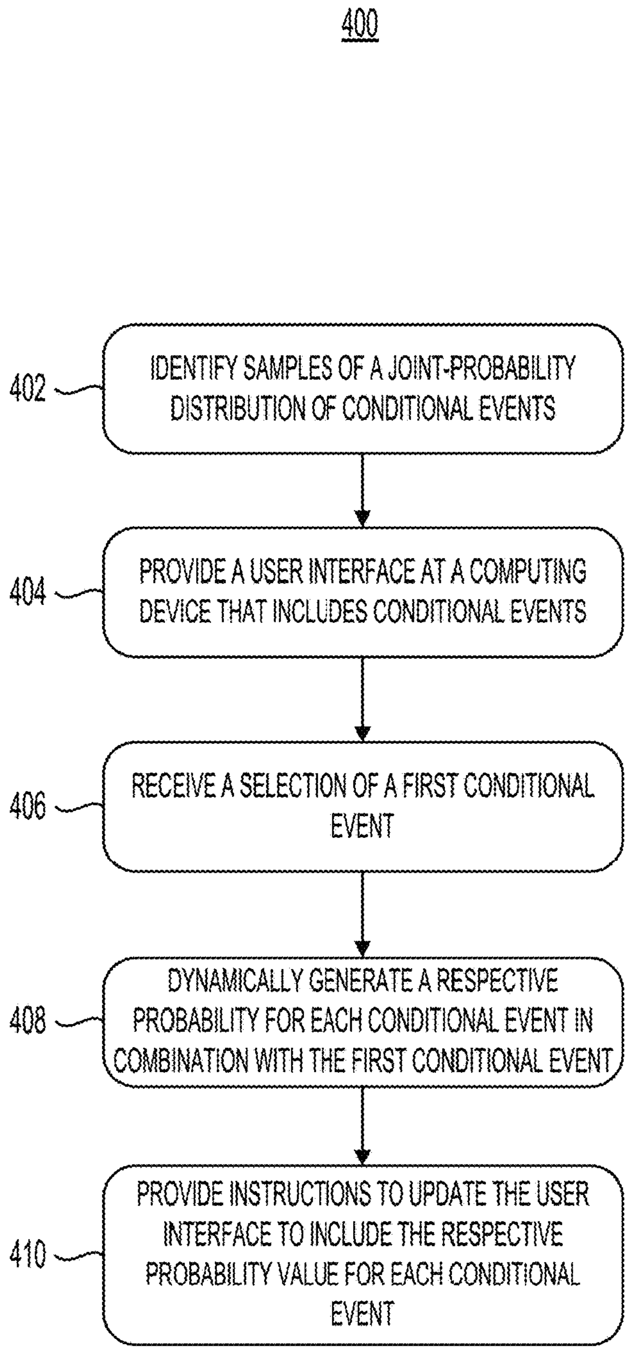
FIG. 4 illustrates an example flow diagram of a method for dynamically updating user interfaces, in accordance with one or more implementations.

Referring to FIG. 4, illustrated is an example flow diagram of a method 400 for dynamically updating user interfaces, in accordance with one or more implementations. The method 400 can be executed, performed, or otherwise carried out by the data processing system 205, the computer system 100 described herein in conjunction with FIGS. 1A-1D, or any other computing devices described herein. In brief overview of the method 400, the data processing system (e.g., the data processing system 205, etc.) can identify samples of a joint-probability distribution (e.g., the samples 280) of conditional events (e.g., the conditional events 275) for a live event (STEP 402), provide a user interface at a computing device (e.g., a client device 22) that includes indicators of one or more conditional events, (STEP 404), receive a selection of a first conditional event (STEP 406), dynamically generate a respective odds value for a parlay wager including each individual conditional event in combination with the selected conditional events (STEP 408), and provide instructions to update the user interface to include the respective probability value for each conditional event (STEP 410).

In further detail of the method 400, the data processing system (e.g., the data processing system 205, etc.) can identify samples of a joint-probability distribution (e.g., the samples 280) of conditional events (e.g., the conditional events 275) for a live event (STEP 402). The data processing system can identify a set of samples of a joint-probability distribution of one or more conditional events to occur during a live event. For example, the data processing system can maintain one or more data structures for each set of samples for a live event that include outcomes of conditional events stored in association with an identifier of the live event. In some implementations, the set of samples can include one or more probability values for the conditional events (e.g., calculated by dividing the number of occurrences of a particular outcome of a conditional event in the set of samples by the total number of simulations executed to generate the set of samples, etc.). In some implementations, the data processing system can generate samples from the joint-probability distribution of the plurality of conditional events based on the data structure. The samples from the joint-probability distribution can be represented by the samples shown in Table 1, for example. Generating the samples can include executing one or more simulations of a live event, or retrieving simulation results from another computing system (not shown) and generating a data structure that includes simulated outcomes for each conditional event that can occur during the corresponding live event. The data processing system can scan through the simulation results to identify outcomes of one or more conditional events associated with the live events, and can generate a data structure (e.g., similar to that represented by Table 1, etc.) corresponding to the samples.

In some implementations, the data processing system can itself generate the simulation results for a live event by executing simulations of the live event. In implementations where the data processing system does not execute the simulations, the data processing system can transmit a request to another computing system to execute the simulations, or poll another computing system for updated simulation data. As described herein, a simulation of a live event can be a model of the event and can produce one or more outputs that correspond to various outcomes of conditional events that can occur during the live event. For example, if the live event is a sporting event, the outcomes may include timestamps of simulated game events (e.g., points scored, passes made, etc.), along with identifiers of participants (e.g., athletes, teams, etc.) that performed the simulated game event or conditions that were satisfied corresponding to the game event.

Executing the simulations can include executing processor-readable instructions that cause the data processing system (or another computing system) to carry out a model of the live event, with the outputs of the simulation being accessed to generate respective samples for of the conditional events that may occur during the live event, as described herein. Each simulation used to generate the samples may depend partially on an element of randomness (e.g., one or more random numbers generated using one or more random number generators), and may be based on various aspects of the particular live event, such as the teams and athletes participating in the live event or any other attribute or characteristic that may influence any outcome that may occur during the live event. As such, the samples generated from each simulation may include different outcomes for the conditional events of the simulated live event.

A predetermined number of simulations can be executed for the live event, for example. The predetermined number may be specified in one or more requests from an external computing device (e.g., a client device, an administrative computing system, an operator of the data processing system, etc.). In some implementations, the number of simulations executed for the live event may be dynamic. For example, simulations may be executed until a condition is met (e.g., simulating as many runs as possible until a time budget is met, until a variance in generated results is met, etc.). In some implementations, the data processing system can generate counter values for each outcome of each conditional event of the live event to which the simulations correspond. The counter values can correspond to a frequency with which a particular outcome of a conditional event (or combination of outcomes of multiple conditional events) occurs in the samples.

The simulations of the live event can be executed as an offline process (e.g., prior to the live event, not in real-time or near real-time, etc.), or may be executed during the live event (e.g., to simulate a remainder of the live event based upon what has already occurred in the live event, based upon changes to conditions of the live event, etc.). The data processing system can determine whether there is a change to the samples (e.g., by detecting a change to a condition of a live event and executing a new run of simulations, receiving a request for new simulations from an external computing system, receiving new simulation results of the live event from an external computing system, etc.). If a change to the samples is detected, the data processing system can communicate with the various components of the data processing system to dynamically update user interfaces displayed at client devices accessing the data processing system to place parlay wagers, as described herein.

The data processing system can provide a user interface at a computing device (e.g., a client device 22) that includes indicators of one or more conditional events (STEP 404). The data processing system may include a webserver or repository of display data that can translate information in the storage (e.g., the storage 215) of the data processing system to displayable data. For example, the data processing system can generate display instructions (e.g., HTML, JavaScript, etc.) that cause a client device to display one or more user interfaces similar to those described in connection with FIGS. 3A-3C. The user interface(s) can be provided to a client device, for example, in response to a request to assemble a parlay wager for one or more live events. The request can be transmitted in response to an interaction with a corresponding user interface element at an application executing at a client device, for example.

The data processing system can receive a selection of a first conditional event (STEP 406). The data processing system can receive, from the client device, a first selection of a first user interface element (e.g., a user interface element 305) corresponding to an outcome of a first conditional event. The interaction can be a tap interaction, a drag interaction, or any other type of interaction that signifies a selection of a corresponding outcome of a conditional event to occur during the live event on which the parlay wager will be placed.

The selection can be received, for example, via the user interface (e.g., user interfaces provided by the data processing system similar to those described in connection with FIGS. 3A-3C, etc.) presented at the client device by the data processing system. As described herein, particular wagers, such as parlay wagers, can include wagers on multiple conditional events. The odds values (e.g., the odds values 310) for such wagers can be calculated across multiple correlated markets, containing a number of outcomes of conditional events. Parlay wagers are assembled from multiple potential outcomes that can occur during the live event. The techniques described herein enable real-time or near real-time updates to the odds values (e.g., the odds values 310) of a parlay wager should an additional chosen outcome of a conditional event (e.g., represented by a respective user interface element 305) be selected by a user. Upon receiving a selection of a particular user interface element, the data processing system can update the bet slip to include the selected outcome of the corresponding conditional event for the live event. The bet slip can be stored in association with the player profile 270 used by the client device to access the functionality of the data processing system.

In some implementations, upon receiving a request to begin assembling a parlay wager from the client device, the data processing system can establish a session for the parlay wager by allocating a corresponding region of memory in the storage of the data processing system, and storing any selections made in the receiver. Upon receiving an indication of a selection of a user interface element (e.g., a user interface element 305), the data processing system can generate updated probabilities for each unselected user interface element presented at the client device, were each unselected user interface element selected for inclusion in the parlay wager. This enables the player to be able to view, in real-time or near real-time, the prospective odds of the parlay wager for a variety of different "next legs," or next selected outcomes, before actually making a selection.

The data processing system can dynamically generate a respective odds value for a parlay wager including each individual conditional event in combination with the selected conditional events (STEP 408). The data processing system can dynamically generate, based on the set of samples and responsive to the first selection, for each outcome of each conditional event that can be selected for the parlay wager during the session created for the user, a respective probability that indicates the total odds of the parlay wager were the respective outcome included in the parlay wager. To do so, the data processing system can iterate through each of the unselected outcomes of conditional events that could be selected for the parlay wager (e.g., which in some implementations may only include the outcomes of conditional events displayed in respective user interface elements of the user interface, or in some implementations may include all selectable outcomes or a subset of selectable outcomes), and can calculate a respective probability value for the parlay wager as if the respective unselected outcome were included in combination with the selected outcomes on the player's bet slip.

To calculate the probability of the parlay wager (including the additional unselected outcome), the data processing system can divide the number of the subset of samples (e.g., simulations) in which the combination of outcomes including the unselected outcome are satisfied by the total number of simulations of the corresponding live event. Because a large number of simulations are executed for the live event, the percentage of the simulations in which the conditions of the parlay wager (including the respective additional unselected outcome of the conditional event) occur is representative of the odds of the conditions of the parlay wager being satisfied in the live event. In some implementations, the data processing system can update the odds values in response to an indication that the samples of the joint-probability distribution of outcomes of conditional events has changed. For example, the data processing system can identify an update to samples of the joint-probability distribution (e.g., by detecting a change to the samples, receiving a signal from an external computing system that executes simulations or provides simulation results, by polling said external computing system, etc.). If a change (e.g., an update) in the samples is detected, the data processing system can dynamically update the respective probability value for the combined selection of conditional events of the parlay wager (including the respective unselected outcome) using the updated samples.

The data processing system can repeat this process for each selection of an additional selected outcome for the parlay wager. For example, if the player selects another outcome of a conditional event for inclusion in the parlay wager, the data processing system can again iterate through each remaining unselected outcome of conditional events, and dynamically generate odds values as if the respective unselected outcome were included in the parlay wager. This enables the player to view both the odds of the currently selected combination of outcomes for the parlay wager, and the odds of the parlay wager should any additional outcome be selected for inclusion in the parlay wager (e.g., the next leg). Because the calculation of these odds values (e.g., the odds values 310) is performed by filtering the samples, the data processing system can perform these operations in real-time or near real-time for large numbers of client devices. The data processing system can maintain a filtered list of samples in the session (e.g., associated with the player profile 270) for the parlay wager, such that the data processing system need only filter the subset of samples (e.g., simulation results) in which the current selection of outcomes of conditional events have occurred. The filtered list of samples may be updated in response to additional selections (as described herein) or in response to an update to the samples generated from simulations of the corresponding live event.

In some implementations, the data processing system can calculate the odds values (e.g., the odds values 310) as described herein, but further based on a margin value. For example, when calculating the odds values for a combination of outcomes of conditional events, the data processing system can calculate a respective margin value based on the respective probability value of the combination (calculated by dividing the number of the subset of samples in which the combination of outcomes including the unselected outcome are satisfied by the total number of simulations of the corresponding live event). In some implementations, the margin value can be calculated further based on a number of selections of outcomes of conditional events received from the client device (e.g., a number of conditions for the parlay wager). For example, a parameter of the margin calculation function can discount the amount of margin added as the leg count (e.g., number of selected outcomes for the parlay wager) increases. In some implementations, the margin value can be calculated further based on at least one of a minimum margin threshold or a maximum margin threshold. The function utilized to calculate the margin can be a skewed curve, for example.

The data processing system can provide instructions to update the user interface to include the respective probability value for each conditional event (STEP 410). Once the odds values have been calculated for each selectable combination of outcomes of conditional events for the parlay wager, the data processing system can provide instructions to update the user interface to include a respective indicator corresponding to the respective probability value (e.g., the odds values 310) for each additional conditional event that can be selected for a parlay wager. The combined selection of conditional events for which the probability values are calculated and presented can include the first selected outcome of the first conditional event and each other outcome of one or more conditional events that can be selected for a parlay wager. The instructions can be, for example, display instructions that cause the native application or web-browser to display updated odds values 310 in the corresponding user interface elements 305. In some implementations, the data processing system can transmit the updated odds values as they are calculated by the data processing system to the respective client device that is currently assembling a parlay wager (e.g., displaying the user interface to select outcomes for inclusion in the parlay wager), with an indication to update the user interface to display the odds values. The updates may be transmitted in response to a respective request from the client device (e.g., which may be polling the data processing system at various intervals for updates to the odds values for the parlay wager, etc.).

After presenting the updated odds values (e.g., the odds values 310) at a user interface, the data processing system can receive a request to place the parlay wager (e.g., which may be transmitted by the client device in response to an interaction with the button 320 shown in FIGS. 3A-3C). The request to place the parlay wager can include a wager amount, and the selections of outcomes for conditional events that were selected as part of the parlay wager using the techniques described herein. The data processing system can generate a data record corresponding to the parlay wager, which can be stored in association with the respective player profile used to access the functionality of the data processing system. The data processing system can monitor the status of the live event to determine whether all of the conditions of the parlay wager are satisfied. If the conditions are not satisfied during the live event, the data processing system can update the data record of the parlay wager indicating that the wager was lost. If the conditions of the parlay wager were satisfied, the data processing system can update the data record to indicate the player won the parlay wager. The data processing system can calculate a payout amount based on the total odds value for the parlay wager and based on the amount wagered on the parlay wager.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompass all kinds of apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system such as the data processing system 205 can include clients and servers. For example, the data processing system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence has any limiting effect on the scope of any claim elements.

The systems and methods described herein may be embodied in other specific forms without departing from the characteristics thereof. Although the examples provided may be useful for dynamically updating user interfaces, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:

one or more processors coupled to a non-transitory memory, the one or more processors configured to:

receive, from an application executing on a client device, a first selection of a first conditional event of a plurality of conditional events presented via a graphical user interface of the application;

dynamically generate, based on a live event corresponding to the plurality of conditional events, for each second conditional event of the plurality of conditional events other than the first conditional event, a respective probability value for a combined selection of conditional events including the first conditional event and the second conditional event; and provide data for a plurality of respective indicators presenting each respective probability value for each combined selection of conditional events, the respective indicator to be presented via the application executing on the client device.

2. The system of claim 1, wherein the one or more processors are further configured to:

determine the respective probability value of the combined selection of conditional events further based on a set of simulation results corresponding to the live event.

3. The system of claim 2, wherein the one or more processors are further configured to:

generate the set of simulation results by performing operations comprising executing a set of simulations of the live event.

4. The system of claim 2, wherein the set of simulation results comprise a set of samples of a joint-probability distribution of the plurality of conditional events to occur during the live event.

5. The system of claim 2, wherein the one or more processors are further configured to:

determine the respective probability value for each combined selection of conditional events by dividing a number of the set of simulation results in which both the first conditional event and the second conditional event occur by a total number of simulations of the live event.

6. The system of claim 1, wherein the one or more processors are further configured to:

receive the first selection of the first conditional event in response to an interaction with a graphical element representing the first conditional event presented in the graphical user interface of the application.

7. The system of claim 1, wherein the one or more processors are further configured to:

provide, for presentation via the application executing on the client device, a first probability value corresponding to the first conditional event.

8. The system of claim 1, wherein the one or more processors are further configured to:

detect an update associated with the live event; and dynamically generate, based on the update to the live event, an updated respective probability value for each combined selection of conditional events.

9. The system of claim 8, wherein the one or more processors are further configured to:

provide second data to the client device to present the updated respective probability value for each combined selection of conditional events.

10. The system of claim 1, wherein the one or more processors are further configured to:

receive a second selection of a second conditional event of the plurality of conditional events.

11. A method, comprising:

receiving, by one or more processors coupled to non-transitory memory, from an application executing on a client device, a first selection of a first conditional event of a plurality of conditional events presented via a graphical user interface of the application;

dynamically generating, by the one or more processors, based on a live event corresponding to the plurality of conditional events, for each second conditional event of the plurality of conditional events other than the first conditional event, a respective probability value for a combined selection of conditional events including the first conditional event and the second conditional event; and providing, by the one or more processors, data for a plurality of respective indicators presenting each respective probability value for each combined selection of conditional events, the respective indicator to be presented via the application executing on the client device.

12. The method of claim 11, further comprising:

determining, by the one or more processors, the respective probability value of the combined selection of conditional events further based on a set of simulation results corresponding to the live event.

13. The method of claim 12, further comprising:

generating, by the one or more processors, the set of simulation results by performing operations comprising executing a set of simulations of the live event.

14. The method of claim 12, wherein the set of simulation results comprise a set of samples of a joint-probability distribution of the plurality of conditional events to occur during the live event.

15. The method of claim 12, further comprising:

determining, by the one or more processors, the respective probability value for each combined selection of conditional events by dividing a number of the set of simulation results in which both the first conditional event and the second conditional event occur by a total number of simulations of the live event.

16. The method of claim 11, further comprising:

receiving, by the one or more processors, the first selection of the first conditional event in response to an interaction with a graphical element representing the first conditional event presented in the graphical user interface of the application.

17. The method of claim 11, further comprising:

providing, by the one or more processors, for presentation via the application executing on the client device, a first probability value corresponding to the first conditional event.

18. The method of claim 11, further comprising:

detecting, by the one or more processors, an update associated with the live event; and dynamically generating, by the one or more processors, based on the update to the live event, an updated respective probability value for each combined selection of conditional events.

19. The method of claim 18, further comprising:

providing, by the one or more processors, second data to the client device to present the updated respective probability value for each combined selection of conditional events.

20. The method of claim 11, further comprising:

receiving, by the one or more processors, a second selection of a second conditional event of the plurality of conditional events.

* * * * *